(12) United States Patent
Tung et al.

(10) Patent No.: US 8,782,241 B2
(45) Date of Patent: Jul. 15, 2014

(54) CLOUD COMPUTING ASSESSMENT TOOL

(75) Inventors: Teresa S. Tung, San Jose, CA (US); Kevin P. Lee, Cupertino, CA (US); Sara L. Renberg, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 107 days.

(21) Appl. No.: 13/164,121

(22) Filed: Jun. 20, 2011

(65) Prior Publication Data

US 2011/0276686 A1 Nov. 10, 2011

Related U.S. Application Data

(62) Division of application No. 12/274,111, filed on Nov. 19, 2008, now Pat. No. 7,987,262.

(51) Int. Cl.
*G06F 15/173* (2006.01)

(52) U.S. Cl.
USPC ........... 709/226; 709/200; 709/223; 709/224; 709/225

(58) Field of Classification Search
USPC .......................... 709/200, 223, 224, 225, 226
See application file for complete search history.

(56) References Cited

U.S. PATENT DOCUMENTS

| | | | |
|---|---|---|---|
| 6,289,389 B1 | 9/2001 | Kikinis | |
| 7,240,091 B1 | 7/2007 | Hopmann et al. | |
| 2001/0054110 A1 | 12/2001 | Kikinis | |
| 2002/0194147 A1* | 12/2002 | Ricke | 706/53 |
| 2004/0143570 A1* | 7/2004 | Klock et al. | 707/3 |
| 2005/0055694 A1* | 3/2005 | Lee | 718/100 |
| 2006/0188143 A1 | 8/2006 | Strasenburg-Kleciak | |
| 2006/0212334 A1* | 9/2006 | Jackson | 705/8 |
| 2007/0011185 A1* | 1/2007 | John | 707/102 |
| 2008/0077366 A1* | 3/2008 | Neuse et al. | 703/2 |
| 2009/0249453 A1 | 10/2009 | Cluck et al. | |
| 2009/0327493 A1 | 12/2009 | Gauthier et al. | |
| 2010/0005173 A1 | 1/2010 | Baskaran et al. | |
| 2010/0042623 A1 | 2/2010 | Feng et al. | |

FOREIGN PATENT DOCUMENTS

JP 2009-93569 4/2009

OTHER PUBLICATIONS

A policy-based cloud broker for the VCL platform, Joshi et al., Int. J. Cloud Computing, vol. X, No. Y, May 5, 2010.*

(Continued)

*Primary Examiner* — Rupal Dharia
*Assistant Examiner* — Van Kim T Nguyen
(74) *Attorney, Agent, or Firm* — Brinks Gilson & Lione

(57) ABSTRACT

A system is described for providing a cloud computing assessment tool. The system may include a memory, an interface, and a processor. The processor may receive a data center configuration from the user. The data center configuration may include a compute and storage capacity. The processor may determine a cloud computing configuration equivalent to the data center configuration. The processor may identify a time period for transitioning from the data center to cloud computing. The processor may identify a plurality of trend values representing changes in the compute capacity and storage capacity over the period of time. The processor may generate a strategy to transition from the data center to cloud computing over the period of time. The strategy may account for the changes in the compute capacity and the storage capacity. The processor may provide a graphical output and a numerical output of the strategy to the user.

13 Claims, 36 Drawing Sheets

(56) References Cited

OTHER PUBLICATIONS

Integrated Lifecycle of IT Services in a Cloud Environment, Joshi et al., Proceeding of The Third International Conference on the Virtual Computing Initiative (ICVCI 2009), October, Research Triangle Park, NC.*

Connecting Client Objectives with Resource Capabilities: An Essential Component for Grid Service Management Infrastructure, Dan et al., Jul. 1, 2004.*

Index of /~cldumitr/docs; connectManagement.pdf; Jul. 1, 2004.*

Office Action issued in corresponding European Patent Application No. 09014457.7, mailed Apr. 10, 2012, 8 pages.

Kazuo Koike et al., IT Infrastructure Governance in the Era of Cloud Approximating Infrastructure Construction/Operation to "What They Should be", IT Architect, published by IDG Japan, Inc. in Japan on Jul. 30, 2009, vol. 24, pp. 80-95.

Shohei Yoshimoto et al., Solution and Technology of Netmarks, Inc., Technical Report: Unisys Technology Review, published by Nihon Unisys, Ltd. in Japan on Nov. 30, 2009, vol. 29, Issue No. 3, pp. 39-53.

* cited by examiner

Home >> Projects >> Profiles >>

Initial Appraisal — Knowledge Base >> Sample Project 1 >>Weblogic Portal

Current Progess 31%

Strategy and Scheduling
General  Performance  Implementation Complexity  Security  Disaster Prevention and Recovery  Configuration Management  Storage  Scorecard Define General Parameters
Configure Initial Infrastructure State
Configure External Factors — Cloud Implementation [Amazon ▼] — 1410
Create Baseline Strategy — Cloud Goal [Agility ▼]
Create Strategies
Results — 1420

Scoring Legend (all Scores are out of 5)
☆ Scores Less than 1 - No
☆ Scores GreaterThan or Equal to 1 and LessThan 2 - No
☆ Scores GreaterThan or Equal to 2 and LessThan 4 - Maybe
☆ Scores GreaterThan or Equal to 4 - Yes

| Evaluation Criteria | Score |
|---|---|
| Is this application safe for the cloud (including data, application and network security issues)? | ★★★★★ Score: 5.0 |
| Given my existing DR strategy, will a move to the cloud realize cost or other advantages for my application? | ★★★☆☆ Score: 3.5 |
| Will there be a measurable gain in performance for the application if I used Amazon as the cloud provider? | ★☆☆☆☆ Score: 1.0 |
| Will it be possible to design, build, and deploy the application with little added complexity using Amazon as the cloud provider? | ★★☆☆☆ Score: 2.0 |
| Is this application safe (including data, application and network security issues) if I use Amazon as the cloud provider? | ★★★☆☆ Score: 3.5 |
| Given my existing DR strategy, will I realize cost or other advantages for my application using Amazon as the cloud provider? | Insufficient Data to Score |

1460

Overall Scores

Opportunity: 3.4 out of 5
Cloud Provider Readiness: 2.2 out of 5

1450

Recommendations

Prev

Feedback

FIG. 14A

Home >> Projects >> Profiles >> Detailed Assessment myClient1 >> Internal Portal >> BEA Weblogic Portal Compute | Storage | General

Data Center Infrastructure
- # of Small Servers: 0 — 1621
- # of Medium Servers: 4 — 1622
- # of Large Servers: 0 — 1623
- Monthly Rent: 3000 — 1624
- Facilities (PUE): 1.5 — 1625

Cloud Infrastructure
- # of Small Instances: 0 — 1641
- # of Large Instances: 0 — 1642
- # of Extra-Large Servers: 0 — 1643
- # of High-CPU Medium Instances: 0 — 1644
- # of High-CPU Extra Large Instances: 0 — 1645

Overall Infrastructure
- Max Load Capacity: 5000 — 1632
- Actual Load: 2000 — 1634

Conversion Calculator — 1650

Submit — 1660

Initial Appraisal   Detailed Assessment   Strategy and Scheduling   Results

FIG. 16

Home >> Projects >> Profiles >>

Knowledge Base >> Sample Project 1 >> Weblogic Portal          Feedback

Initial Appraisal

Strategy and Scheduling  1610

| General | Compute | Storage |

Note: All amounts should be inputed in terms of total per month

Define General Parameters

Configure Initial Infrastructure State

Configure External Factors

Create Baseline Strategy

Create Strategies

Results

Data Center Infrastructure

- CPU Processing Speed (GHz) [3] —1671
- Number of CPU Cores / Processor [2] —1672
- Number of CPU Processors / Server [2] —1673
- Amount of RAM (GB) [0] —1674
- Server Power Rating (W) [400] —1675
- [Browse] —1676
- Number of Servers [2] —1677
- Monthly Rent ($) [3000] —1624
- Facilities (PUE) [0] —1625

Overall Infrastructure

Max Load Capacity [4000] —1632

1620
1630
1650 — [Conversion Calculator]
1660 — [Submit]

Home >> Projects >> Profiles >> Detailed Assessment myClient1 >> Internal Portal >> BEA Weblogic Portal

| Compute | Storage | General |

Data Center Infrastructure
- GBs Used / Month [0] — 1821
- Monthly Inbound Data Transfer (GB) [0] — 1822
- Monthly Outbound Data Transfer (GB) [0] — 1823

Cloud Infrastructure — 1840
- GBs Used / Month [0] — 1841
- Monthly Inbound Data Transfer (GB) [0] — 1842
- Monthly Outbound Data Transfer (GB) [0] — 1843

Overall Infrastructure
- Max Storage Capacity (GBs) [0] — 1831
- Backup Frequency [0] — 1832
- Retention Time [0] — 1833

[Conversion Calculator] — 1850

[Submit] — 1860

Initial Appraisal   Detailed Assessment   Strategy and Scheduling   Results 1810, 1820, 1830, 1800

FIG. 18

Home >> Projects >> Profiles >> Detailed Assessment myClient1 >> Internal Portal >> BEA Weblogic Portal Compute | Storage | General — 1910

Data Center Infrastructure — 1920
- Total Licensing Costs [0] — 1921
- Total Personnel Costs [0] — 1922
- PSRR [0] — 1923
- Time-to-Market [0] — 1924

Cloud Infrastructure — 1930
- Total Licensing Costs [0] — 1931
- Total Personnel Costs [0] — 1932
- Time-to-Market [0] — 1933

Overall Infrastructure — 1940
- Infrastructure Allocation Intervals [Monthly ▼] — 1941
- Start Date [11/01/2008] — 1942
- End Date [11/01/2010] — 1943

[Conversion Calculator] — 1950
[Submit] — 1960

Initial Appraisal   Detailed Assessment   Strategy and Scheduling   Results

CLOUD COMPUTING ASSESSMENT TOOL

RELATED APPLICATIONS

This application claims priority to U.S. patent application Ser. No. 12/274,111, filed Nov. 19, 2008, which is also incorporated herein by reference in its entirety.

TECHNICAL FIELD

The present description relates generally to a system and method, generally referred to as a system, for assessing whether one or more computing components, such as data center components, should be transitioned to a cloud computing infrastructure, and more particularly, but not exclusively, to identifying a strategic plan for transitioning one or more computing components to a cloud computing infrastructure.

BACKGROUND

A cloud computing implementation of a software application allows an organization to access the application through the Internet without knowledge of, expertise with, or control over the technology infrastructure supporting the application. Cloud computing provides many benefits over traditional infrastructure models where compute equipment is owned or leased and housed in a server room, data center, or collocation site, such as on-demand procurement, reduced cost, increased capability in terms of compute and storage, flexibility and application mobility. For example, applications may be provided that are accessible from a web browser, while the application software and data are centrally stored. Cloud computing may add complexity over traditional infrastructure models in terms of regulation compliance and controllability; organizations may have difficulty determining the trade-off between the benefits and the complexity.

SUMMARY

A system for providing a cloud computing assessment tool may include a memory, an interface, and a processor. The memory may be connected to the processor and the interface and may store a data center configuration, a cloud computing configuration, and a plurality of trend values. The interface may be connected to the memory and the processor and may communicate with a user. The processor may receive the data center configuration from the user via the interface. The data center configuration may include a compute capacity of the data center and a storage capacity of the data center. The processor may determine a cloud computing configuration capable of the compute capacity and the storage capacity of the data center configuration. The processor may identify a period of time for a transition from the data center configuration to the cloud computing configuration. The processor may identify a plurality of trend values. The trend values may represent changes in the compute capacity and storage capacity over the period of time. The processor may generate a strategy, as well as compute its financial impact, to transition from the data center configuration to the cloud computing configuration over the period of time. The strategy may account for the change in the compute capacity and the storage capacity over the period of time. The processor may provide a graphical output of the strategy to the user.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 14A is a screenshot of an alternative user interface for viewing a cloud computing assessment in the system of FIG. 1, or other systems for providing a cloud computing assessment tool.

FIG. 16 is a screenshot of a user interface for inputting compute requirements of a computing component in the system of FIG. 1, or other systems for providing a cloud computing assessment tool.

FIG. 16A is a screenshot of an alternative user interface for inputting compute requirements of a computing component in the system of FIG. 1, or other systems for providing a cloud computing assessment tool.

FIG. 17 is a screenshot of a user interface for converting data center and cloud computing infrastructure data in the system of FIG. 1, or other systems for providing a cloud computing assessment tool.

FIG. 18 is a screenshot of a user interface for inputting storage requirements of a computing component in the system of FIG. 1, or other systems for providing a cloud computing assessment tool.

FIG. 19 is a screenshot of a user interface for inputting general requirements of a computing component in the system of FIG. 1, or other systems for providing a cloud computing assessment tool.

FIG. 24A is a screenshot of an alternative user interface for inputting compute requirements for a time interval in the system of FIG. 1, or other systems for providing a cloud computing assessment tool.

FIG. 26A is a screenshot of an alternative user interface for inputting general requirements for a time interval in the system of FIG. 1, or other systems for providing a cloud computing assessment tool.

DETAILED DESCRIPTION

A system and method, generally referred to as a system, may relate to assessing whether one or more computing components, such as data center components, should be transitioned to a cloud computing infrastructure, and more particularly, but not exclusively, to identifying a strategic plan for transitioning one or more computing components to a cloud computing infrastructure. The principles described herein may be embodied in many different forms.

The system may provide a user with a decision support tool to determine whether an organization should transition one or more computing components from a traditional data center infrastructure to a cloud computing infrastructure. The data center infrastructure may include traditional infrastructure models where servers and storage capability are purchased before the need for the storage or compute exists. The system may use several factors in determining a computing component should be transitioned to a cloud computing infrastructure, such as cost savings, time-to-market, adaptability, or improved computing capabilities. The system may identify and suggest a cloud computing provider who is most capable of providing the cloud services required by the computing component.

The system may generate a cloud computing transition strategy for an organization. The cloud computing transition strategy assists an organization with transitioning from a data center infrastructure to a cloud computing infrastructure. The system may incorporate one or more trend values into a transition strategy, such as the change in compute capacity and/or the change in storage capacity throughout the transition period, and the financial resources available for the transition. The system may automatically adjust the transition strategy to account for the trend values. The system may allow a user to create multiple transition strategies to compare the effects of the trend values on the transition strategies. The system may provide one or more reports capturing the cost, risks and benefits of transitioning to cloud computing.

Figure 1:
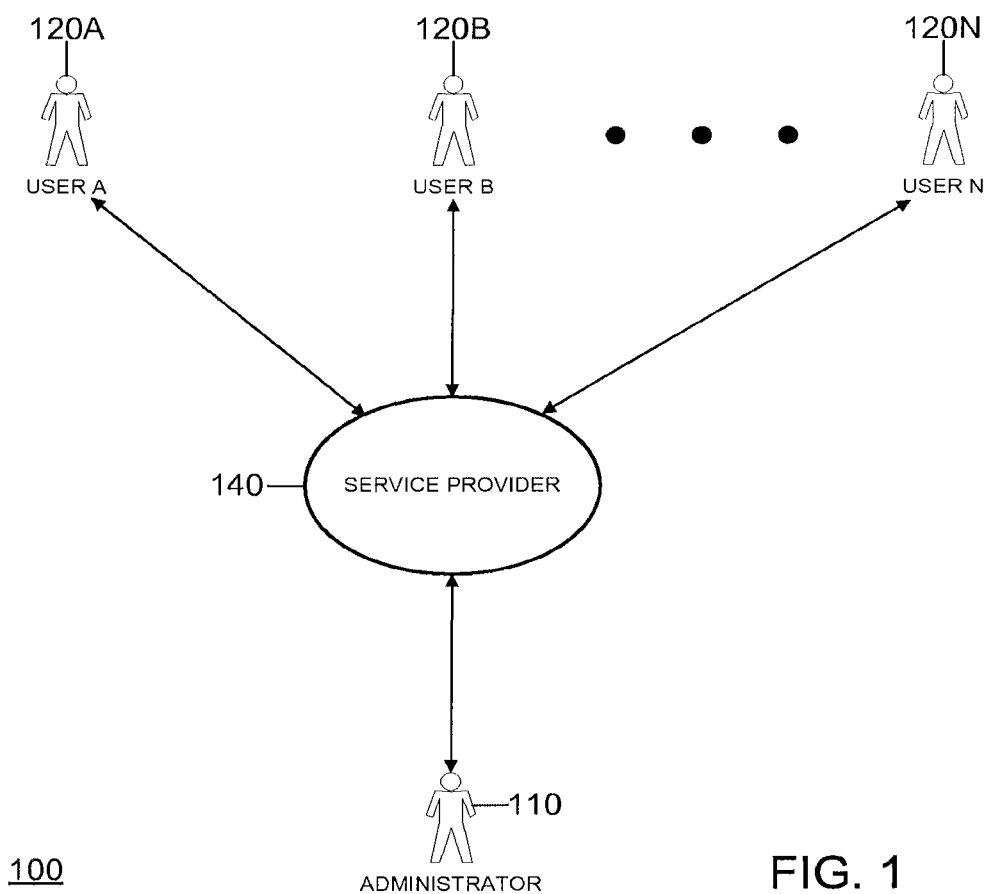
FIG. 1 is a block diagram of a general overview of a system for providing a cloud computing assessment tool.

FIG. 1 provides a general overview of a system 100 for providing a cloud computing assessment tool. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more users 120A-N, a service provider 140, and an administrator 130. The users 120A-N may be persons responsible for determining whether an organization should transition one or more computing components to a cloud computing infrastructure. For example, persons from a consulting service, such as ACCENTURE, may be the users 120A-N. The service provider 140 may provide a cloud computing assessment tool to the users 120A-N. The tool may assist the users 120A-N in determining whether an organization should transition one or more computing components to a cloud computing infrastructure. The tool may also assist the users 120A-N in generating a plan, or strategy, for transitioning the computing components to a cloud computing infrastructure. The computing components may be part of a data center, a server room, an office, or a co-location site. Thus, the tool is not limited to computing components housed within a data center, and may handle all computing components considered as candidates for transitioning to a cloud computing configuration. The administrator 130 may be a person or an automated process, and may be responsible for maintaining a database of cloud computing providers, cloud computing implementation styles, cloud goals, and one or more questions and answers related to a cloud computing transition.

In operation the service provider 140 may provide the user A 120A with an interface allowing the user A 120A to input information describing an organization. The organization information may be copied, deleted or shared between the users 120A-N. Once the organization has been identified, the user A 120A may input one or more profiles for the organization. The profiles may describe a computing component, such as a system, an application, or an architecture component. For example, one profile may represent a billing system while another profile may represent a database. The profiles may be associated with one or more goals which are targeted with a transition to cloud computing, such as cost avoidance, agility, high performance computing or time-to-market.

The service provider 140 may generate a set of questions for the user A 120A for each profile. The questions may assist the user A 120A in describing the computing component of the profile. Each question may be associated with one or more answers. Each answer may describe a characteristic of the computing component and may be associated with a score value. The score value may relate to the suitability of the characteristic described by the answer for a cloud computing transition. For example, if the selected answer describes a characteristic that is suitable for cloud computing, the score may be a five. However if the selected answer describes a characteristic that is not suitable for cloud computing, the score may be a one.

The user A 120A may provide an answer to each of the questions to the service provider 140 through the interface. The service provider 140 may determine the score associated with each of the answers, such as by looking up the score in a database. The database may be populated and maintained by the administrator 130. The administrator 130 may also populate and maintain a database storing data describing one or more cloud computing providers. Each cloud computing provider described in the database may be associated with weight values for each of answers to each of the questions provided to the user A 120A. The weight values for each cloud computing provider may relate to the significance of the answer to each question to the capabilities of each cloud computing provider.

The service provider 140 may retrieve the weight value of each answer for each cloud computing provider and may determine a weighted score for each question and each cloud computing provider. The service provider 140 may then calculate an average weighted question score for each cloud computing provider to determine a cloud computing provider score. Alternatively or in addition, each score may also be weighted based on one or more of the goals associated with the profile, such as cost avoidance, agility, or elasticity, high performance computing or time to market. Agility or elasticity may refer to the ability to scale resources up or down as necessary. The service provider 140 may then identify the highest cloud computing provider score and may determine whether the highest score meets a cloud computing transition criteria. The cloud computing transition criteria may be a minimum score value identified by the administrator 130. If the highest cloud computing provider score does not meet the cloud computing transition criteria, the service provider 140 notifies the user A 120A that the profile is not suitable for a cloud computing transition. If the highest cloud computing provider score meets the cloud transition criteria the service provider 140 provides the user A 120A with a description of the cloud computing provider with the highest cloud computing provider score. The steps of determining a cloud computing provider score for each cloud computing provider may be discussed in more detail in FIG. 4 below.

If the profile is a candidate for a transition to cloud computing, the service provider 140 provides the user A 120A with an interface for planning a transition strategy for the profile. The user A 120A may identify the current configuration of the computing component represented by the profile, a period of time for the transition, and one or more trend values which may effect the transition. The external values may include compute capacity requirements, storage capacity requirements, hardware costs, energy costs, cloud computing costs, and equipment power rating. The service provider 140 may determine a cloud computing configuration equivalent to the current configuration of the computing component. The service provider 140 may use the current configuration of the computing component, the equivalent cloud computing configuration, the period of time and the external values to generate a strategy for transitioning to the cloud computing configuration. The generation of the transition strategy may be discussed in more detail in FIG. 5 below.

Alternatively or in addition the user A 120A may manually generate a transition strategy. A user generated transition strategy may include both data center and cloud computing infrastructures. The user A 120A may manually generate multiple transition strategies, which may be used to compare the effects of variances in the trend values on the strategies. The strategies may divide the time period of the transition into sequential time intervals. Each time interval may be referred to as a wave, and may incorporate one or more trend values. More detail regarding implementing multiple time intervals, or waves, as well as their structure, function and operation, can be found in commonly owned U.S. patent application Ser. No. 12/030,040, filed on Feb. 12, 2008, entitled "SYSTEM FOR PROVIDING STRATEGIES FOR INCREASING EFFICIENCY OF DATA CENTERS" and U.S. patent application Ser. No. 12/144,910, filed on Jun. 24, 2008, entitled "SYSTEM FOR PROVIDING STRATEGIES TO REDUCE THE CARBON OUTPUT AND OPERATING COSTS OF A WORKPLACE", all of which are hereby incorporated herein by reference in their entirety. The systems and methods herein associated with cloud computing assessment tools may be practiced in combination with methods and systems described in the above-identified patent applications incorporated by reference.

The service provider 140 may output a graph displaying the effects of the transition strategy on the costs, agility, time to market and high performance computing of the profile. The costs may be represented in traditional metrics, such as return on investment, operating expenditure and capital expenditure. The agility and time to market may be displayed on a timeline of expected computing requirements and the computing requirements provided by the transition strategy at each time interval. The high performance computing may be displayed in a graph showing when the maximum capacity load fails to meet the expected load. If the user A 120A identified more than one transition strategy for the profile, the service provider 140 may display each transition strategy on the same graph in order to allow the user A 120A to compare the transition strategies.

Figure 2:
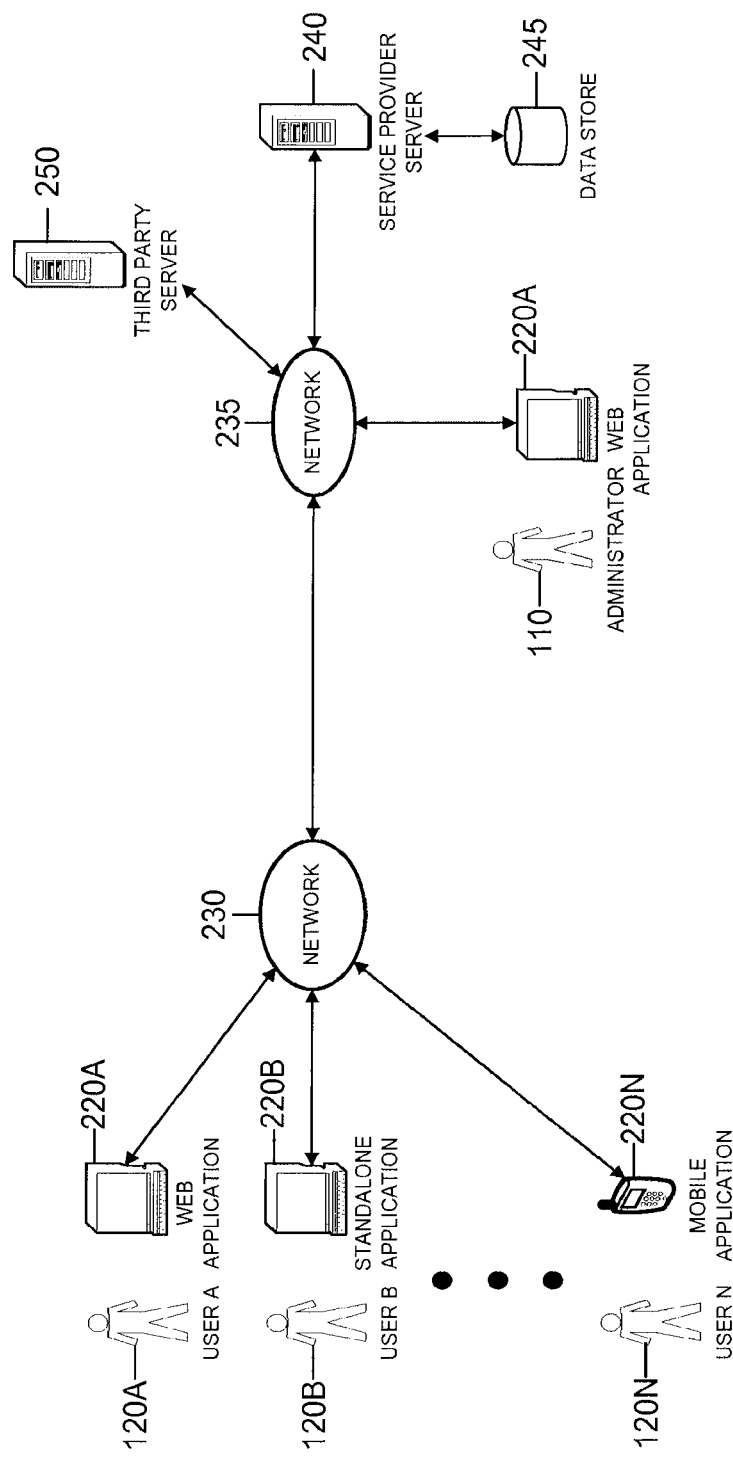
FIG. 2 is a block diagram of a network environment implementing the system of FIG. 1 or other systems for providing a cloud computing assessment tool.

FIG. 2 provides a view of a network environment 200 implementing the system of FIG. 1 or other systems for providing a cloud computing assessment tool. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more users 120A-N, an administrator 130, a service provider server 240, a third party server 250, a data store 245, networks 230, 235, and one or more web applications, standalone applications, mobile applications 220A-N, which may collectively be referred to as client applications.

Some or all of the service provider server 240 and the third party server 250 may be in communication with each other by way of network 235. The administrator 130 may use a web application 220A to interface with the service provider server 240 and maintain the historical data, which may consist of data center data, service provider data, question/scoring data. Alternatively or in addition the administrator 130 may use a mobile application 220N or a standalone application 220B to interface with the service provider server 240.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The web applications, standalone applications and mobile applications 220A-N may be connected to the network 230 in any configuration that supports data transfer. This may include a data connection to the network 230 that may be wired or wireless. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, automobile and/or any appliance or platform capable of data communications. The web application 220A may support a rich internet application implemented with the ADOBE FLEX® technologies.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the service provider server 240. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a mobile application server, a data store, a database server, and a middleware server. The service provider server 240 may exist on one machine or may be running in a distributed configuration on one or more machines.

Figure 31:
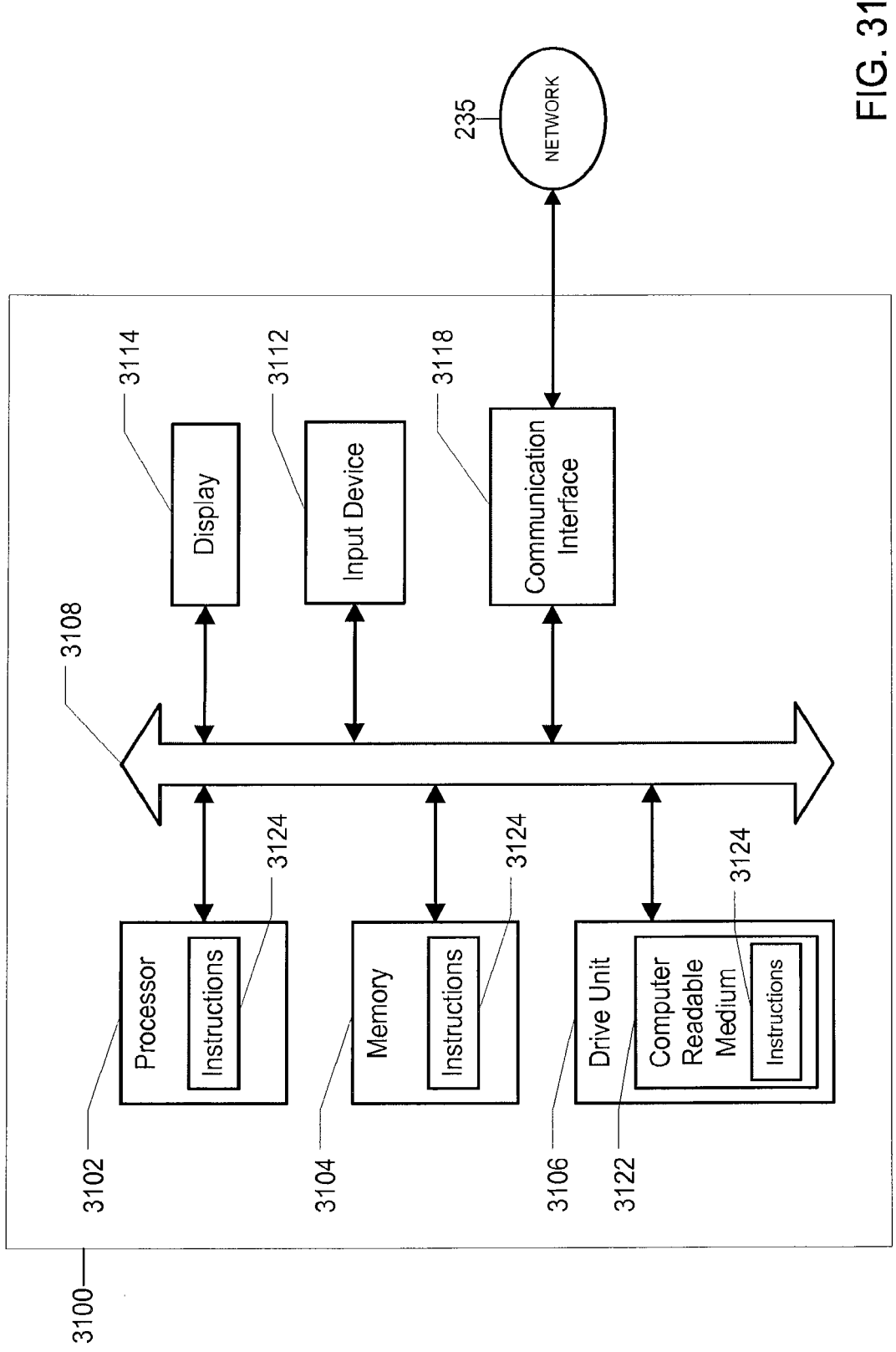
FIG. 31 is an illustration of a general computer system that may be used in the systems of FIG. 2, and FIG. 3, or other systems for providing a cloud computing assessment tool.

The service provider server 240 and client applications 220A-N may be one or more computing devices of various kinds, such as the computing device in FIG. 31. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 220A may employ the Hypertext Transfer Protocol ("HTTP") to request information, such as a web page, from a web server, which may be a process executing on the service provider server 240.

There may be several configurations of database servers, application servers, mobile application servers, and middleware applications included in the service provider server 240. The data store 245 may be part of the service provider server 240 and may be a database server, such as MICROSOFT SQL SERVER®, ORACLE®, IBM DB2®, SQLITE®, or any other database software, relational or otherwise. The data store 245 may store the historical data center information. The application server may be APACHE TOMCAT®, MICROSOFT IIS®, ADOBE COLDFUSION®, or any other application server that supports communication protocols. The middleware application may be any middleware that provides additional functionality between the application server and the clients 220A-N, such as a PHP: HYPERTEXT PREPROCESSOR ("PHP"). The middleware application may also include a backend integration component, which may be implemented with any programming language and framework that supports backend integration, such as the PYTHON language and DJANGO framework, the JAVA language and IBATIS framework, or the JAVA language and HIBERNATE framework.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation the user A 120A may access the service provided by the service provider 140 through the web application 220A and the network 230. The web application 220A may download a client side application from the service provider server 240 using ADOBE FLASH PLAYER 9. The web application 220A may request data from the middleware application, such as a PHP server or PYTHON-enabled server. The PHP/PYTHON server may query the information from the data store 245 and communicate the information to the web application 220A. The user A 120A may interact with the client side application through the web application 220A. The data may be passed between the web application 220A and the database 245 via the PHP/PYTHON server. The majority of the calculations may be performed on the service provider server 240, although some calculations may be completed on the web application 220A in order to speed up response times.

Alternatively or in addition the client applications 220A-N may be able to function in both an online and an offline mode. The client applications 220A-N may include a locally cached data store for offline operations. The local and remote data store 245 may synchronize when online operations are available. In one example the system 100 may use ADOBE AIR® to implement the online and offline functionality.

Figure 3:
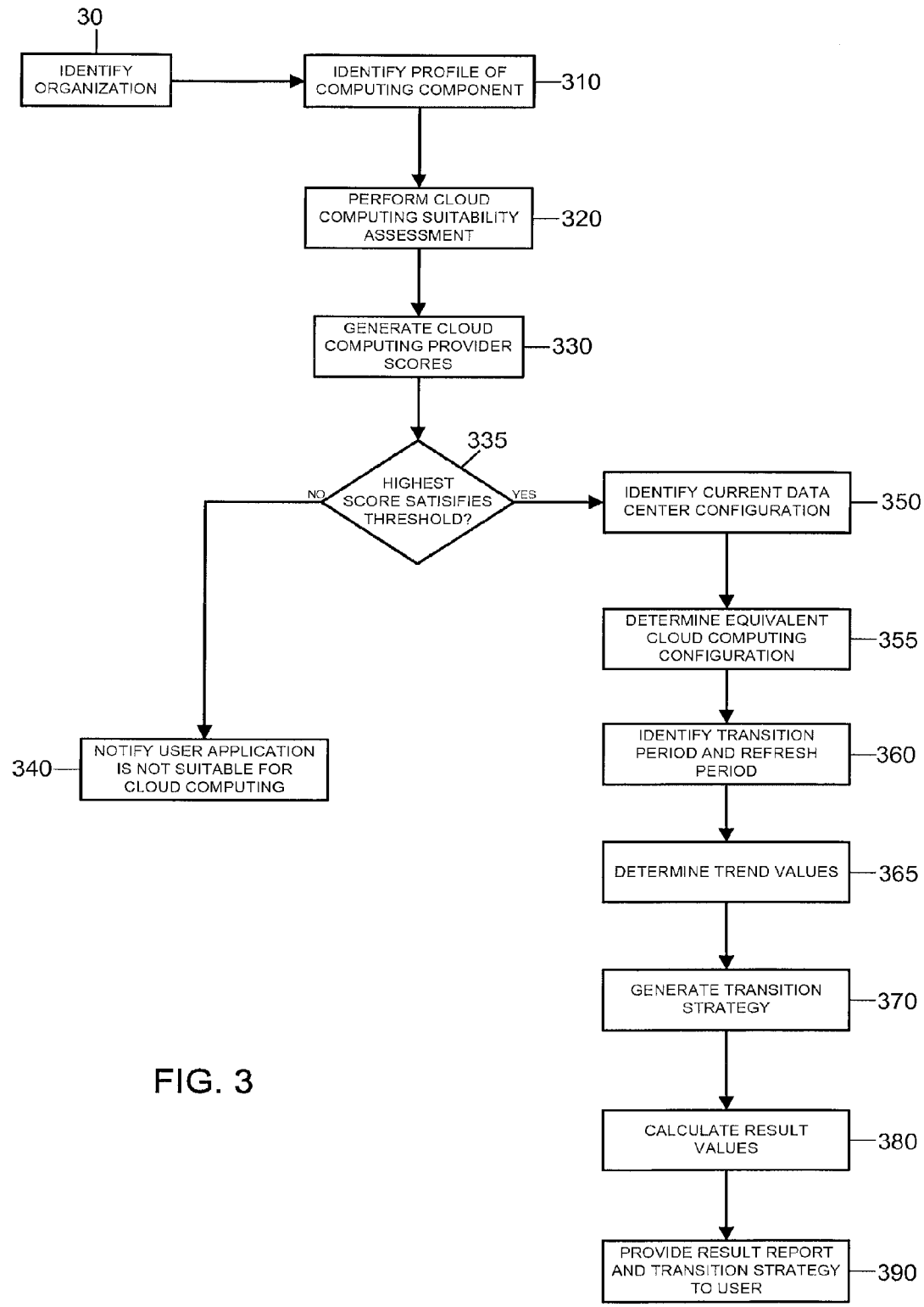
FIG. 3 is a flowchart illustrating the operations of the system of FIG. 1, or other systems for providing a cloud computing assessment tool.
Figure 7:
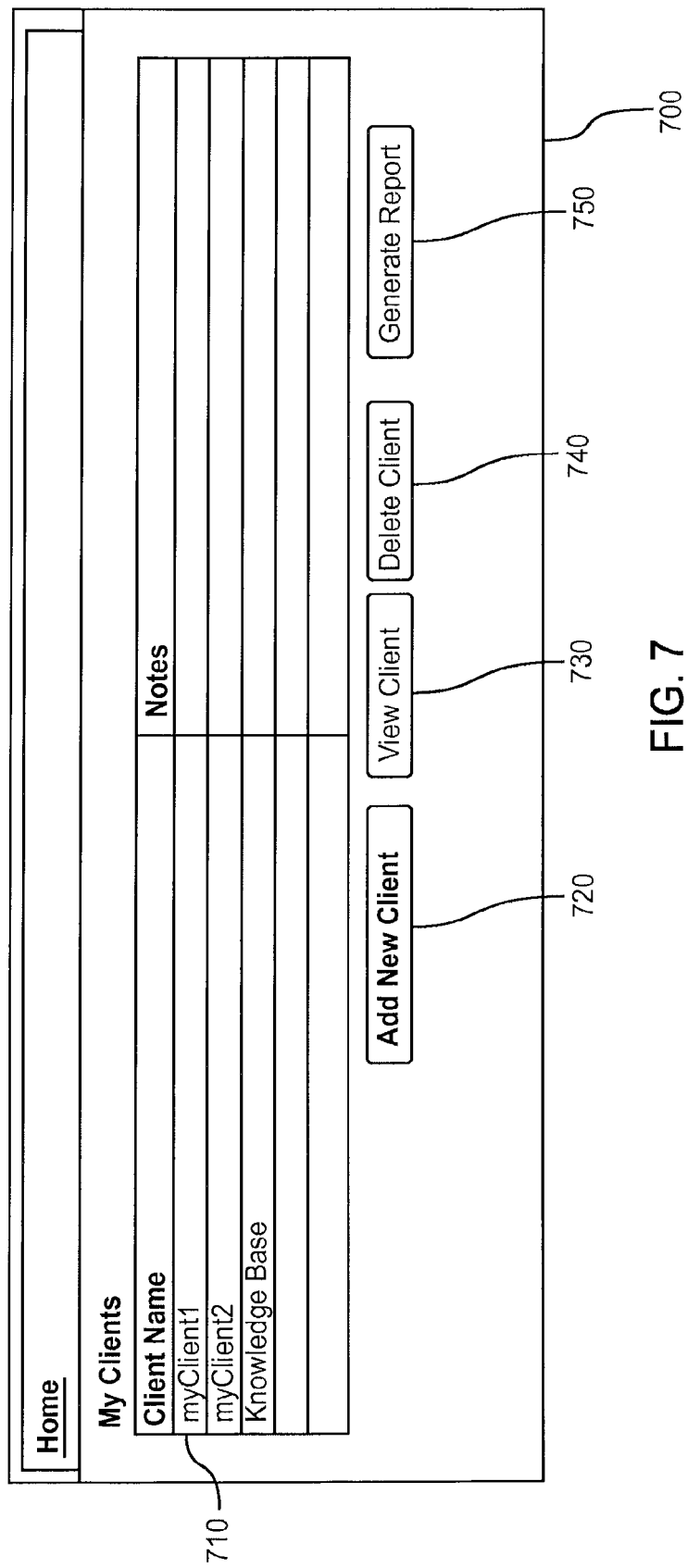
FIG. 7 is a screenshot of a user interface for managing organization information in the system of FIG. 1, or other systems for providing a cloud computing assessment tool.
Figure 8:
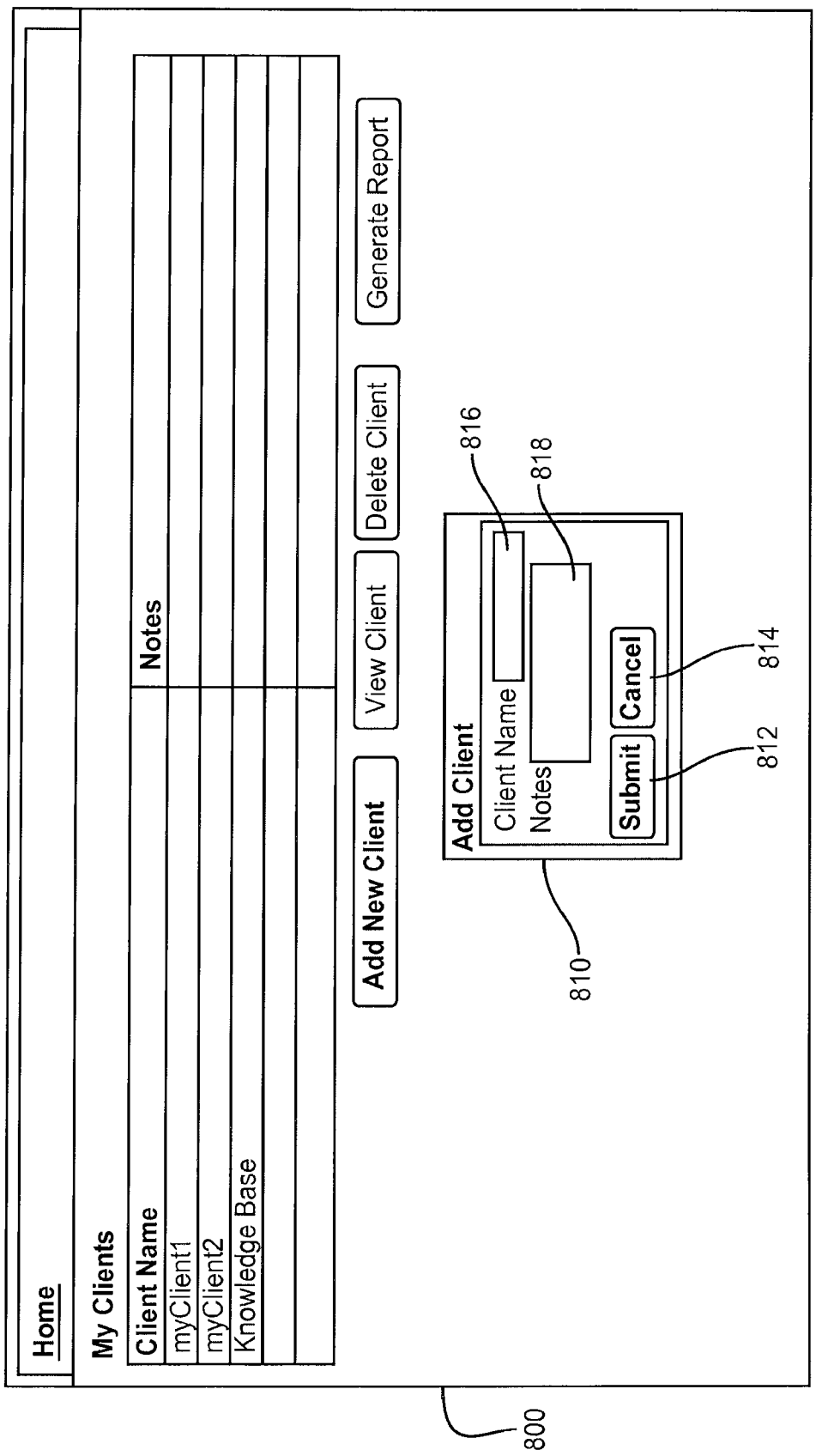
FIG. 8 is a screenshot of a user interface for adding an organization in the system of FIG. 1, or other systems for providing a cloud computing assessment tool.

FIG. 3 is a flowchart illustrating the operations of the system of FIG. 1, or other systems for providing a cloud computing assessment tool. At step 305, the system 100 may provide the user A 120A with a user interface for identifying an organization. The user A 120A may use the user interface to identify an organization existing in the system 100 or to add a new organization. For example, if the user A 120A is a consultant, the organization may be one or more clients that are served by the user A 120A. FIG. 7 below provides a screenshot of an exemplary user interface for identifying an existing organization, while FIG. 8 provides a screenshot of an exemplary user interface for adding a new organization.

Figure 11:
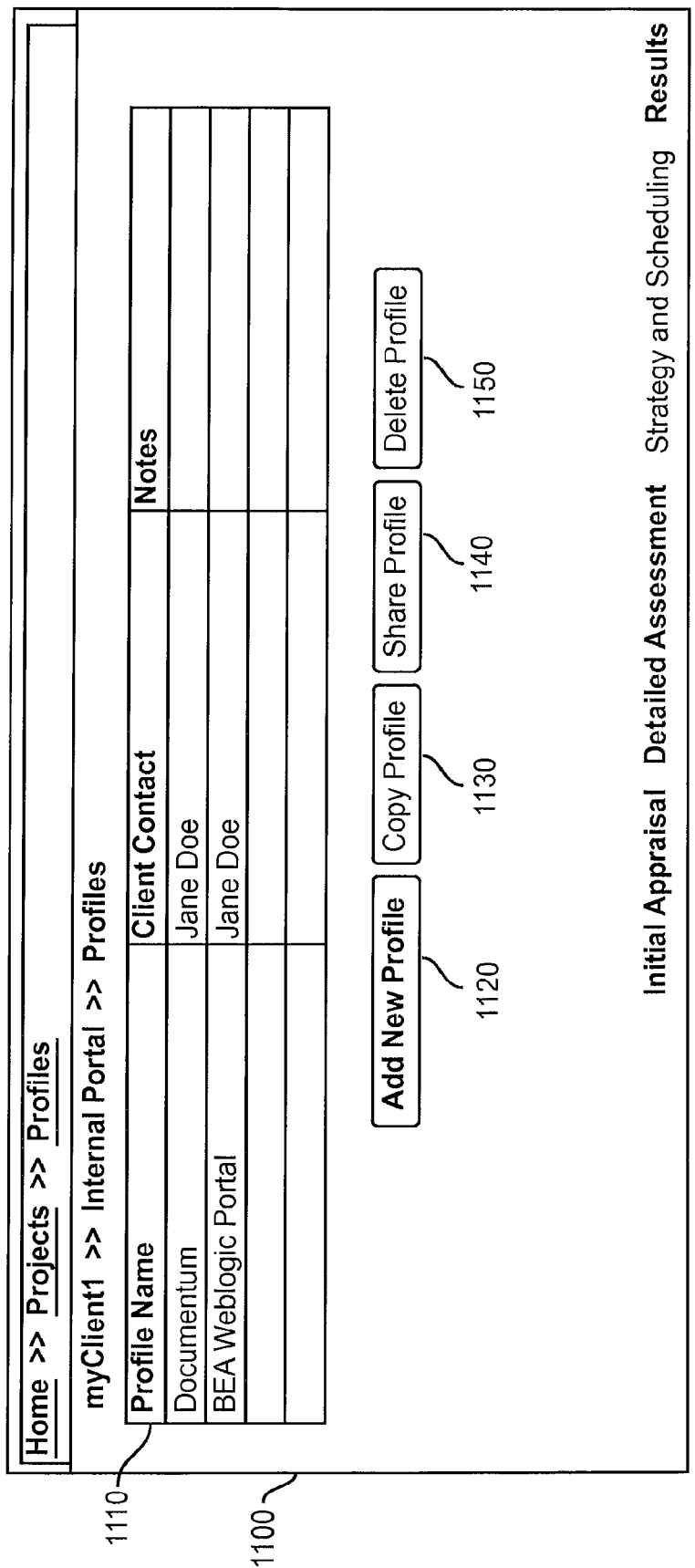
FIG. 11 is a screenshot of a user interface for managing profile information in the system of FIG. 1, or other systems for providing a cloud computing assessment tool.
Figure 12:
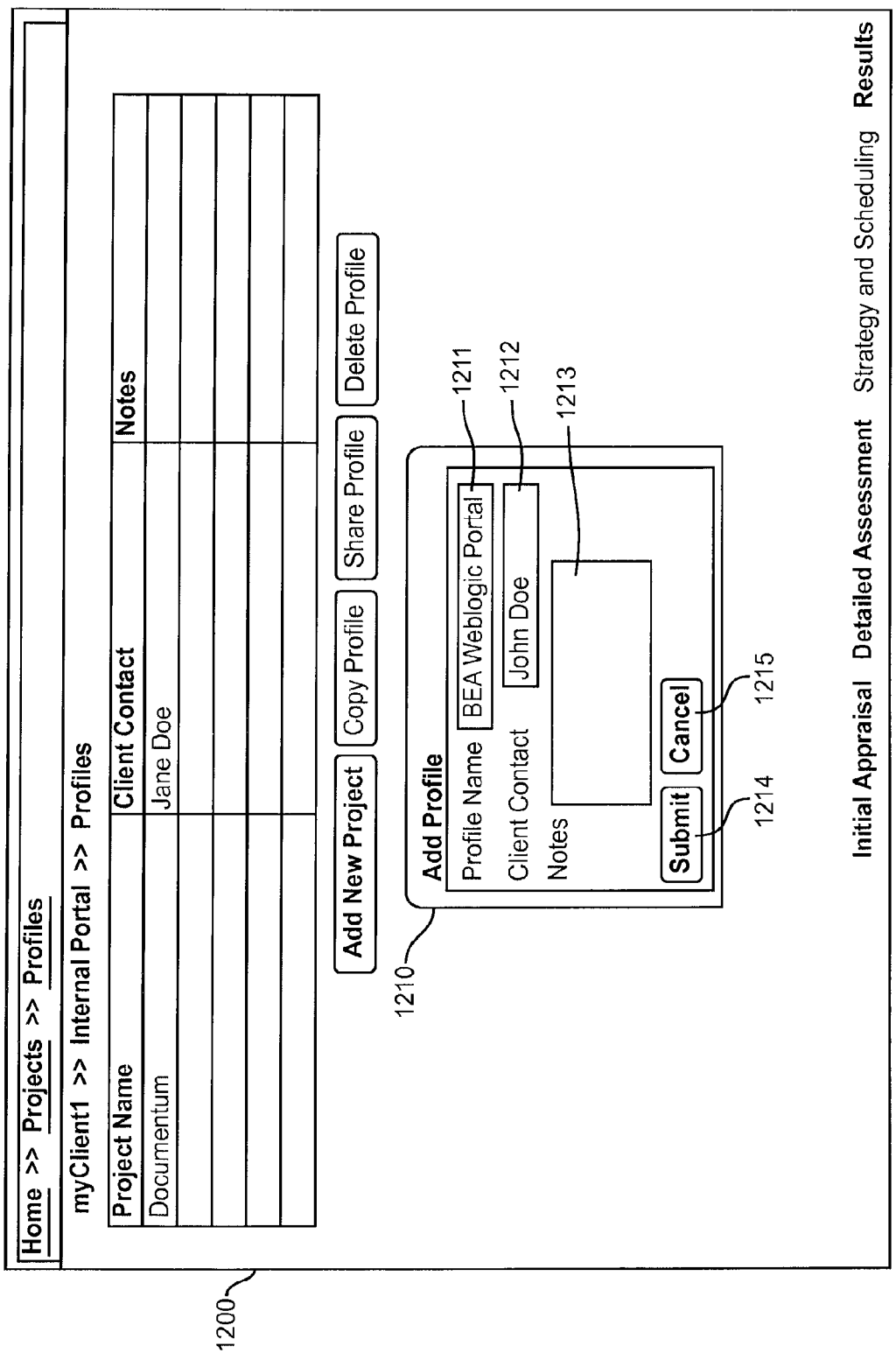
FIG. 12 is a screenshot of a user interface for adding a profile in the system of FIG. 1, or other systems for providing a cloud computing assessment tool.

At step 310, the system 100 may provide the user A 120A with a user interface for identifying a profile describing a computing component of the organization. For example, the profile may describe a billing system, a database, or generally any computing software or hardware that can be transitioned to a cloud computing implementation. The user A 120A may use the use interface to select a profile existing in the system 100 or to add a new profile. FIG. 11 below provides a screenshot of an exemplary user interface for identifying an existing profile, while FIG. 12 provides a screenshot of an exemplary user interface for adding a new profile.

Figure 13:
FIG. 13 is a screenshot of a user interface for inputting data center characteristics in the system of FIG. 1, or other systems for providing a cloud computing assessment tool.

At step 330, the system 100 may provide the user A 120A with an interface for assessing the suitability of the computing component described in the profile for a transition to cloud computing. FIG. 13 below provides a screenshot of an exemplary user interface for assessing a computing component described by the profile. The assessment may include one or more questions which may assist the user A 120A in further describing the computing component. The user A 120A may use the user interface to select answers to the questions that best represent the computing component described by the profile. At step 330, the system 100 may generate a cloud computing provider score for each cloud computing provider represented in the system 100. The cloud computing provider score of each cloud computing provider may be based on a score value associated with each answer provided by the user A 120A and weight value for each answer associated with the cloud service provider. The steps of assessing the computing component and generating the cloud computing provider scores may be described in more detail in FIG. 4 below.

At step 335 the system 100 may determine whether the highest cloud computing provider score satisfies a cloud computing transition criteria. For example, the criteria may be a minimum cloud computing provider score. The minimum cloud computing provider score may be identified by the administrator 130 as the minimum score for which a cloud computing transition is practical. For example, a cloud computing transition may not be practical if the costs are too high or there are no cloud computing providers providing the type of service required by the profile. If the highest cloud computing provider score does not meet the cloud computing criteria, the system 100 moves to step 340. At step 340, the system 100 notifies the user A 120A that the profile is not suitable for a transition to cloud computing.

If, at step 335, the system 100 determines that the highest cloud computing provider score meets the criteria, then the system 100 moves to step 350. At step 350, the system 100 provides the user A 120A with a user interface for identifying the current data center configuration for the computing component described by the profile. The data center configuration may include any planned, owned, or leased compute and storage capacity that may also be fulfilled by equipment housed in an office, a server room, or a collocation site. The user A 120A uses the use interface to input a description of the current data center configuration. FIG. 16, FIG. 18, and FIG. 19 below provide screenshots of exemplary user interfaces for inputting a description of the current data center configuration.

At step 355, the system 100 determines a cloud computing configuration, on the cloud computing provider with the highest cloud computing provider score, which is equivalent to the data center configuration inputted by the user A 120A in step 350. For example, the system 100 may determine a cloud computing configuration capable of providing the equivalent compute and storage capacity as the data center configuration. The configuration may be specific to the cloud computing provider or may be a generic configuration which may be used across any of the cloud computing providers. Alternatively or in addition, the system 100 may provide the user A 120A with an interface for manually inputting the configuration of an equivalent cloud computing configuration. The user A 120A may use the interface to input an equivalent cloud computing configuration. FIGS. 16-19 below provide screenshots of exemplary user interfaces for manually inputting the equivalent cloud computing configuration.

At step 360, the system 100 provides the user A 120A with an interface for identifying the period of time allocated for the transition and the minimum refresh period for the organization. The user A 120A may use the user interface to input the period of time of the transition and the refresh period of the organization. The minimum refresh period may represent the minimum amount of time, such as months or years, in between technology upgrades.

Figure 22:
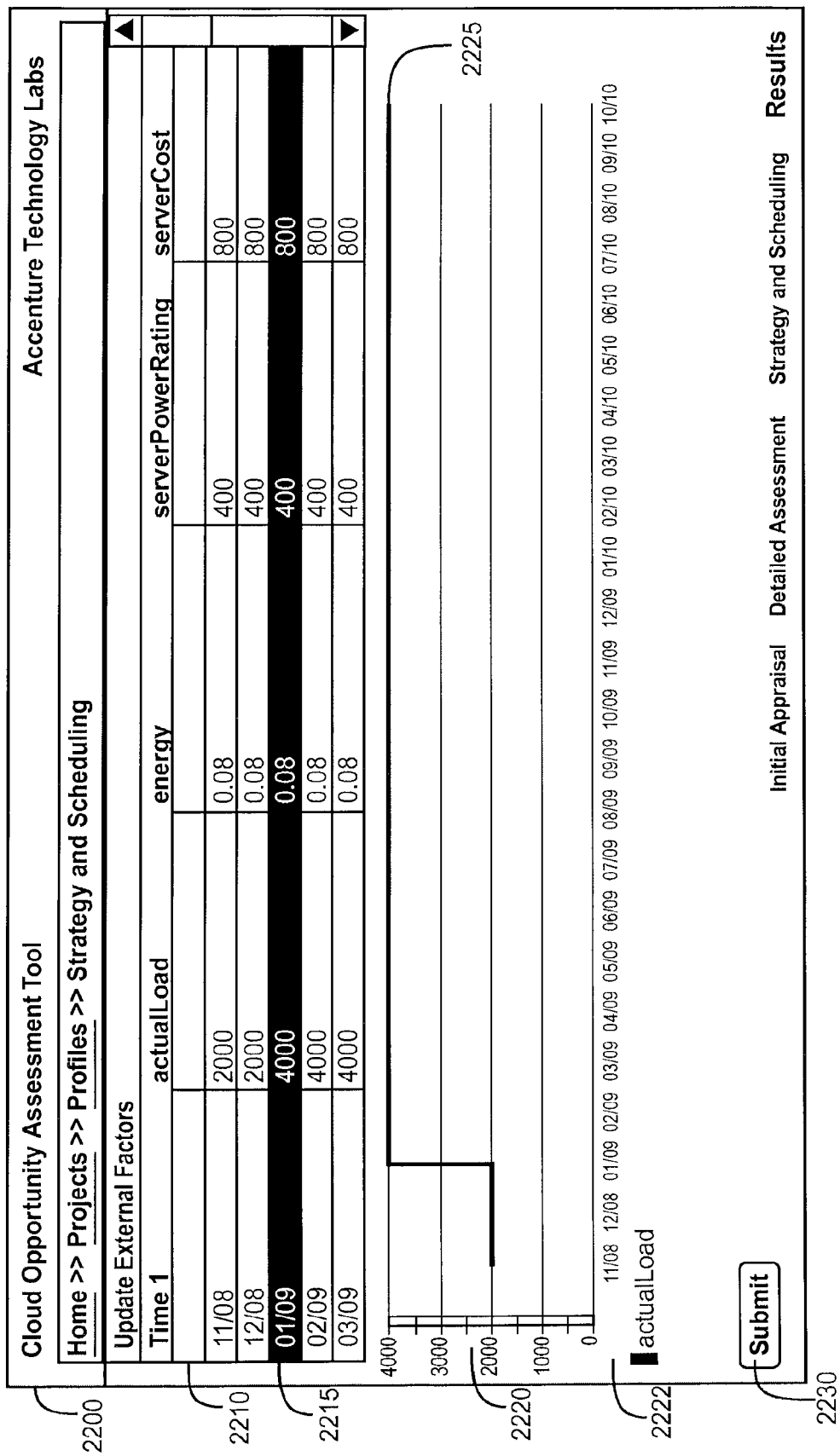
FIG. 22 is a screenshot of a user interface for viewing trend values in the system of FIG. 1, or other systems for providing a cloud computing assessment tool.

At step 365, the system 100 may determine the trend values for the transition from the data center configuration to the cloud computing configuration. The trend values may represent changes in values associated with the transition over the transition period. For example, the trend values may include changes in required compute capacity, required storage capacity, hardware costs, energy costs, the cloud computing costs, or equipment power rating. The system 100 may determine how the trend values change over the transition period. Alternatively or in addition, the system 100 may provide the user A 120A with an interface for inputting the trend values over the transition period. FIG. 22 below provides a screenshot of an exemplary user interface for inputting trend values over the transition period.

Figure 23:
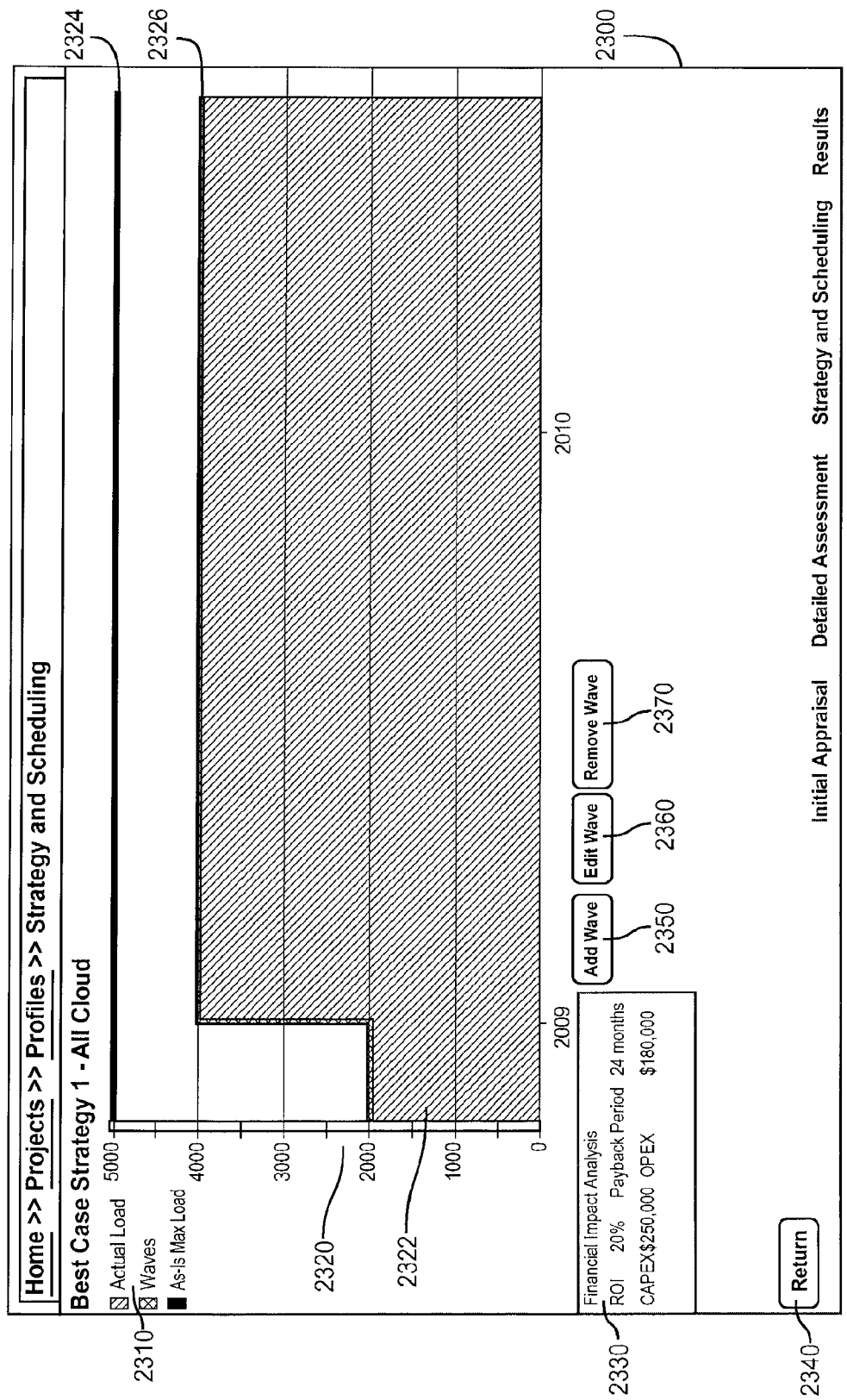
FIG. 23 is a screenshot of a report screen in the system of FIG. 1, or other systems for providing a cloud computing assessment tool.
Figure 24:
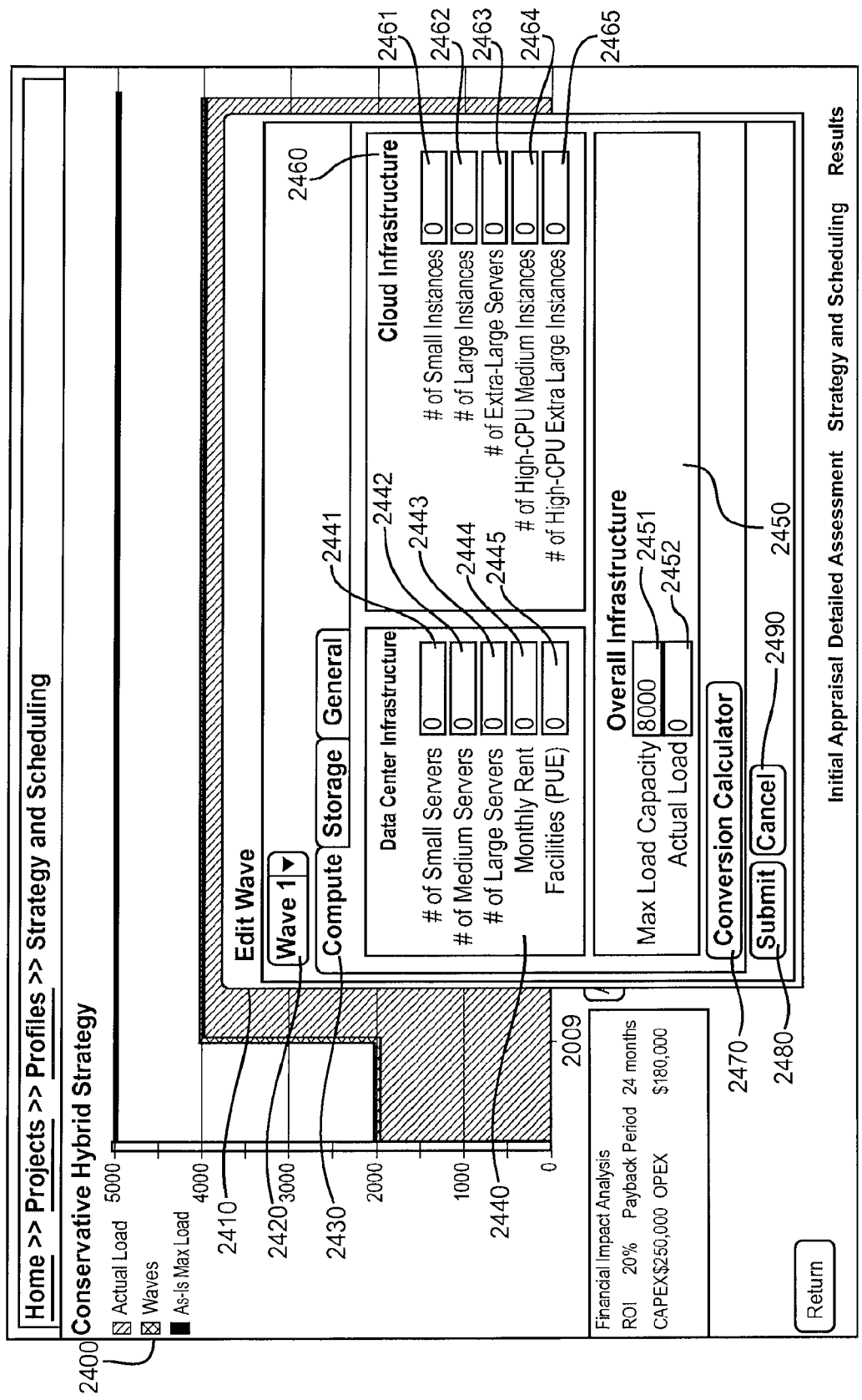
FIG. 24 is a screenshot of a user interface for inputting compute requirements for a time interval in the system of FIG. 1, or other systems for providing a cloud computing assessment tool.
Figure 25:
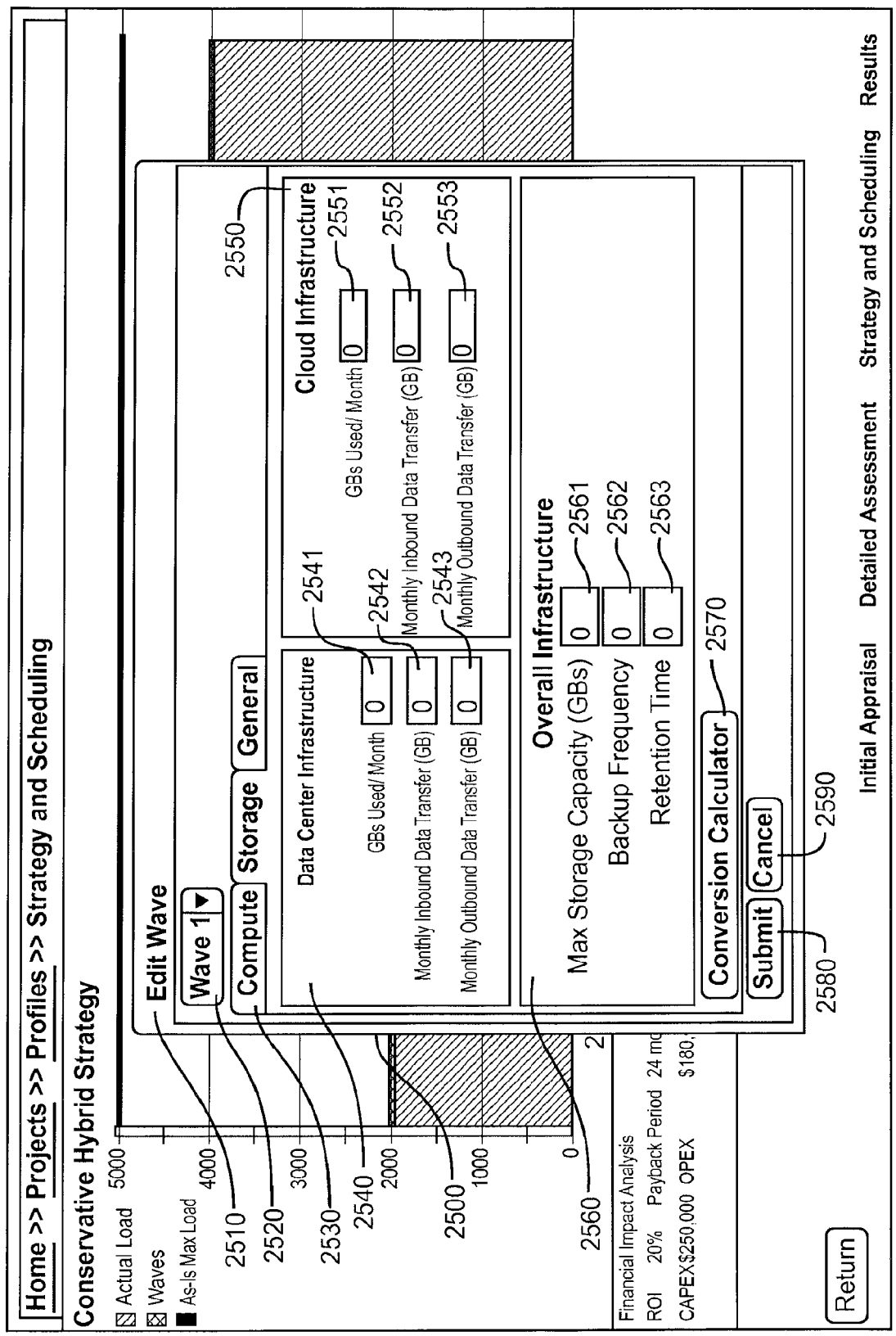
FIG. 25 is a screenshot of a user interface for inputting storage requirements for a time interval in the system of FIG. 1, or other systems for providing a cloud computing assessment tool.

At step 370, the system 100 may generate a cloud computing transition strategy. The system 100 may use the trend values, the period of time of the transition, and the minimum refresh period to determine a transition strategy that migrates the computing components to cloud computing within the constraints of the trend values and the minimum refresh period. For example, if the period of time for the transition is six years, and the minimum refresh period is two years, the transition strategy may migrate thirty-three percent of the computing components to cloud computing each refresh period. Alternatively or in addition the system 100 may provide the user A 120A with a user interface for inputting a transition strategy. The user A 120A may use the user interface to input the transition across one or more time intervals, or waves, of the transition period. FIGS. 23-25 below provide exemplary user interfaces for inputting a transition strategy. Alternatively or in addition, the user A 120A may input more multiple transition strategies. Each transition strategy may be associated with different trend values. The user A 120A may wish to input multiple transition strategies to view the effects of differing trend values on the strategies.

At step 380, the system 100 calculates the result values for each transition strategy. The result values may include cost metrics, such as return on investment, operating expenditures and capital expenditures, agility and time-to market values and high performance computing values. At step 390, the system 100 may generate a results report and provide the results report and the transition strategies to the user A 120A. The transition strategy may be displayed in a graphical output. The results report may include one or more graphs comparing the result values for the current data center configuration against the result values for each of the identified transition strategies. The results report may include a side-by-side view of result values of each of the identified transition strategies. The cost metrics may be displayed on a graph, such as the graph displayed in the screenshot of FIGS. 28 and 29 below. The agility and time-to-market values may be displayed on a timeline showing the expected computing and storage requirements and the computing and storage requirements achieved by each transition strategy. The high performance computing values may be displayed in a graph showing when the maximum computing requirements of the solution do not meet the expected computing requirements. One or more of the reports or graphs may be converted to a document format such as an ADOBE document format or a MICROSOFT EXCEL document format.

Figure 4:
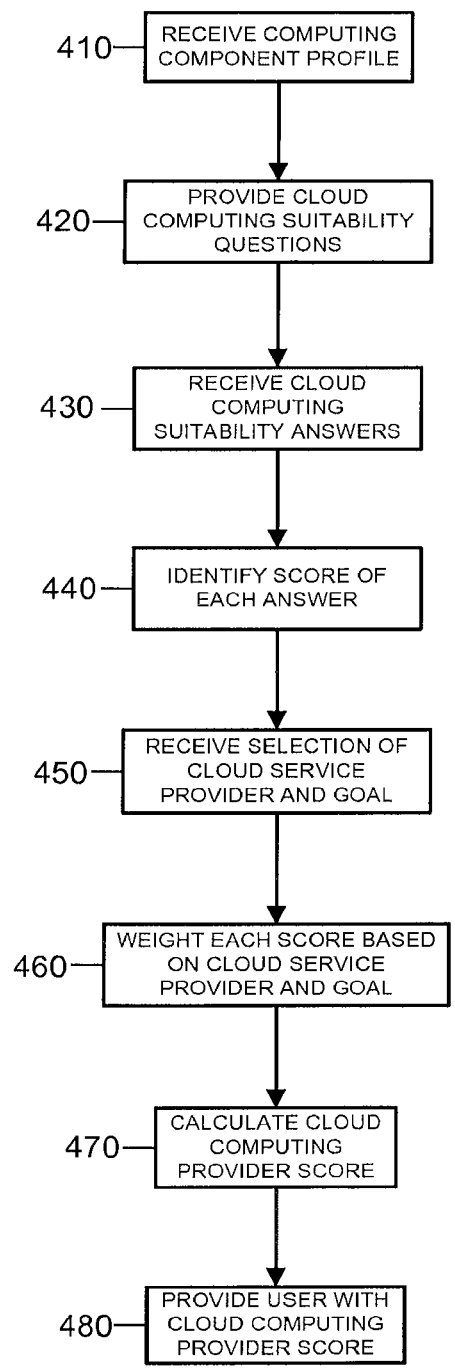
FIG. 4 is a flowchart illustrating the operations of determining whether a computing component should be transitioned to a cloud computing infrastructure in the system of FIG. 1, or other systems for providing a cloud computing assessment tool.

FIG. 4 is a flowchart illustrating the operations of determining whether a computing component should be transitioned to a cloud computing infrastructure in the system of FIG. 1, or other systems for providing a cloud computing assessment tool. At step 410, the system 100 receives a profile describing a computing component, such as a billing system or a database. At step 420, the system 100 provides the user A 120A with a user interface displaying a set of questions relating to the characteristics of the computing component and the suitability of the characteristics for a transition to cloud computing. The answers provided by the user A 120A may provide a more detailed description of the computing component. The questions may be used to determine the environment of the computing component, such as production, the operating system used by the computing component, such as LINUX, whether the computing component is open source or commercial, whether the computer component is part of an existing implementation or a greenfield implementation, the acceptable amount of downtime, the expected time to market, whether the existing implementation requires collocation, or generally any characteristic of the computing component which may be useful in assessing cloud computing suitability. The questions may also be related to the performance of the computing component, the implementation complexity of the computing component, the security of the computing component, the disaster prevention and recovery of the computing component, the storage of the computing component, and the configuration management of the computing component. For example, a question may relate to whether specialized hardware is required for the computing component, such as a graphics processing unit, peripherals, or hardware XML accelerators. Alternatively or in addition, the questions provided to the user A 120A may be dynamic, such that the answer provided by the user A 120A to a first question may effect the second question that is provided to the user A 120A.

At step 430, the system 100 receives answers to the questions from the user A 120A via the user interface. At step 440, the system 100 determines the score value associated with each answer provided by the user A 120A. The score value for each answer may be provided by the administrator 130 and stored in the data store 245. The score value may be based on whether the characteristic described by the answer is suitable for a transition to cloud computing. For example, the score value may be higher if the answer provided by the user A 120A indicates that the computing component is suitable for a cloud computing implementation, while the score value may be lower if the answer provided by the user A 120A indicates that the computing component is not suitable for a transition to cloud computing. Alternatively or in addition the scores may have the same score, such as a score of 1. For example, if the question relates to whether specialized hardware is required for the computing component, the answers may be "yes" and "no." Both answers may have a score of 1.

Alternatively or in addition, the system 100 may determine a cloud computing opportunity score and/or a cloud computing readiness score. The cloud computing opportunity score may indicate whether a cloud computing service exists capable of hosting the computing component, whereas the cloud computing readiness score may indicate whether the computing component is ready for a transition to cloud computing. For example, an answer to a question related to a service level agreement associated with the computing component may result in a cloud computing readiness score, while the answer to a question related to the compute requirements of the computing component may receive a cloud computing opportunity score.

Figure 14:
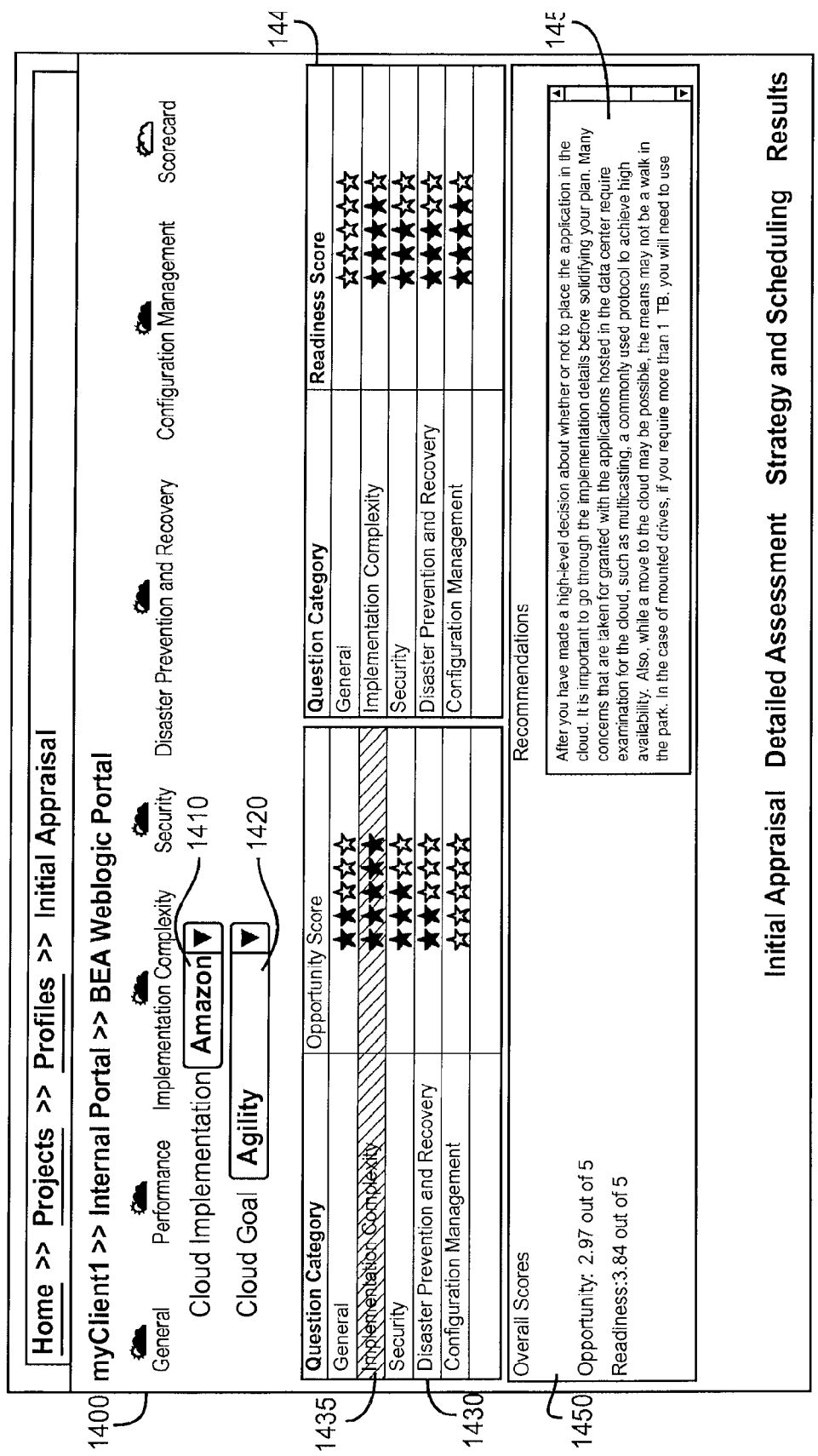
FIG. 14 is a screenshot of a user interface for viewing a cloud computing assessment in the system of FIG. 1, or other systems for providing a cloud computing assessment tool.

At step 450, the system 100 may provide the user A 120A with an interface for selecting a cloud computing provider and a cloud computing goal. The cloud computing goal may describe the goal of transitioning to a cloud computing infrastructure, such as improved performance or cost avoidance. The user A 120A may use the user interface to select a cloud computing provider and cloud computing goal. FIG. 14 provides a screenshot of an exemplary user interface for selecting a cloud computing provider and a cloud computing goal.

At step 460, the system 100 may determine the weight for each score for the selected cloud computing provider and the selected cloud goal. Each cloud computing provider and each cloud goal may be associated with a vector of weights, with a weight corresponding to each question and/or each answer. The weights for each cloud computing provider and each cloud goal may be multiplied by the score of each question to determine the weighted cloud computing provider/cloud goal score for each question. In the case of a cloud computing provider, the weights may relate to the significance of the answer to the question to the capabilities of the cloud computing provider. For example, if an answer to a question indicates that the computing component would be suitable for a transition to a cloud computing provider, the weight of the question for the cloud computing provider would be high. Conversely, if the answer indicates that the computing component is not suitable for a transition to the cloud computing provider the weight may be low.

The cloud computing providers may offer different from each other in the areas of service level agreements, data residency, application compatibility, and performance. In the case of service level agreements, the cloud service providers may offer differing percentages of guaranteed up-time. This may be significant to the computing component if the computing component requires a minimum uptime. In the case of data residency, the cloud service providers may offer differing guarantees as to where an organization's data is stored. For example, one cloud service provider may guarantee that an organization's data is stored in the United States while another may not. This may be significant to a computing component if the organization requires the data be stored in a particular locale, such as the United States. In the case of application compatibility, the cloud service providers may support different operating systems. This may be significant to a computing component if the computing component requires a particular operating system. In the case of performance, the cloud service providers may offer servers with differing levels of computing power. This may be significant to the computing component if the computing component requires high performance computing.

For example, if the question relates to whether the computing component requires specialized hardware, the weight associated with each cloud computing provider may be based on whether the cloud computing provider can provide specialized hardware. The weights may be in a range of 1 to 5, with 1 being the lowest and 5 being the highest. If the cloud provider can not provide specialized hardware, the cloud computing provider's weight for an answer of "yes" may be 1, while the cloud computing provider's weight for an answer of "no" may be 4. Since the cloud computing provider can not provide the specialized hardware, the question is weighted lower if the computing component requires specialized hardware. Conversely, if a cloud computing provider can provide specialized hardware, the cloud computing provider's weight for a "yes" answer may be 3, while the cloud computing provider's weight for a "no" answer may be 4.

In the case of a cloud goal, if a particular question indicates that a transition of the computing component to the cloud computing provider would be significant towards meeting the cloud goal, then the weight for the cloud goal may be high. Conversely, if a particular question indicates that a transition of the computing component to cloud computing on the cloud computing provider would not be significant towards meeting the cloud goal, then the weight for the cloud goal may be low. A question may be more significant to a cloud goal if the question directly relates to the cloud goal. For example, if the cloud goal was high performance computing, then performance related questions may be weighted higher than other questions. Alternatively or in addition, if cost avoidance was the cloud goal, then a service level agreement question may be weighted higher than a time-to-market question. The administrator 130 may create and store the weight vectors for the cloud computing providers and the cloud goals and store the vectors in the data store 245.

For example, if the question relates to whether the computing component requires specialized hardware, the weight associated with each cloud goal may be based on the significance of specialized hardware to each cloud goal. In the case of a cloud goal related to cost reduction, specialized hardware may not be highly significant to the cloud goal. Thus, on a scale of 1 to 10, 1 being the lowest and 10 being the highest, the cloud goal weight value for the question may be 5. In the case of a cloud goal related to high powered computing, specialized hardware may be highly significant to the cloud goal. Thus, the cloud goal weight value for the question may be a 10.

At step 470, the system 100 may calculate the total cloud computing provider score. The total score may be computed by adding each of the individual weighted scores, may be computed by taking an average of individual weighted scores, or may be computed by some other weighted arithmetic combination. Alternatively or in addition, if the system 100 calculates separate cloud computing opportunity scores and cloud computing readiness scores, the system 100 may calculate a total cloud computing opportunity score and a total cloud computing readiness score.

At step 480, the system 100 may provide the user A 120A with the cloud computing provider score for the cloud computing provider and the cloud goal. The scores may be presented to the user A 120A in raw numbers, or may be presented to the user A 120A with graphical items, such as stars. Alternatively or in addition the scores may be colored differently to illustrate the differences between the scores. For example, a good score may be colored green, a moderate score may be colored yellow, and a bad score may be colored red. FIG. 14 provides a screenshot of an exemplary user interface for displaying the cloud computing provider score. Alternatively or in addition, the system 100 may provide the user A 120A with an indication of whether a transition of the computing component to the cloud computing provider is suitable for accomplishing the cloud goal. For example, the administrator 130 may determine a minimum cloud computing provider score. If the cloud computing provider score does not meet the minimum cloud computing provider score, then the system 100 may notify the user A 120A that a transition of the computing component to the cloud computing provider is not suitable for meeting the cloud goal.

Alternatively or in addition, the system 100 may allow the user A 120A to select a second cloud computing provider and cloud goal and may display the cloud computing provider score for the second cloud computing provider and cloud goal. Alternatively or in addition, the system 100 may display a graph showing the cloud computing provider scores for each cloud computing provider and each cloud computing goal. The graph may allow the user A 120A to identify the cloud computing provider most suitable for accomplishing each cloud goal.

Alternatively or in addition, the user A 120A may only identify a cloud goal, and not a cloud computing provider. In this case, the system 100 may determine the cloud computing provider with the highest cloud computing provider score for the cloud goal and may provide the user A 120A with a report describing the cloud computing provider with the highest cloud computing provider score for the cloud computing goal.

Alternatively or in addition, the user A 120A may only identify a cloud computing provider, and not a cloud goal. In this case, the system 100, may determine the cloud computing provider score for the cloud computing provider for each of the cloud goals. The system 100 may display a report to the user A 120A showing the cloud computing provider score for each of the cloud goals for the computing component.

Figure 5:
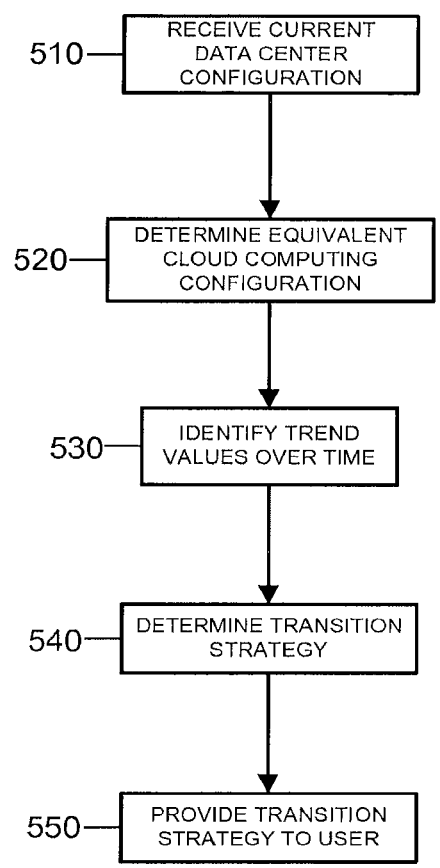
FIG. 5 is a flowchart illustrating the operations of developing a strategy for transitioning a data center to a cloud computing infrastructure in the system of FIG. 1, or other systems for providing a cloud computing assessment tool.

FIG. 5 is a flowchart illustrating the operations of developing a strategy for transitioning a data center to a cloud computing infrastructure in the system of FIG. 1, or other systems for providing a cloud computing assessment tool. At step 510, the system 100 provides the user A 120A with a user interface for inputting a current data center configuration. The user A 120A may use the interface to input the current configuration of a data center. At step 520, the system 100 determines a cloud computing configuration capable of providing the equivalent compute capacity and storage capacity as the identified data center. Alternatively or in addition, the system 100 may provide the user A 120A with a user interface for inputting an equivalent, or desired, cloud computing configuration. At step 530, the system 100 provides the user A 120A with an interface for inputting trend values. The user A 120A may use the user interface to provide one or more trend values. The trend values may effect the compute and/or storage capacity requirements over the transition period.

At step 540, the system 100 generates a transition strategy describing the transition from the current data center configuration to the identified cloud computing configuration. The transition strategy incorporates the trend values such that a projected increase in compute capacity or storage capacity is reflected in the transition strategy. For example, if the trend values indicate a projected compute capacity increase of ten percent, the transition strategy matches the ten percent increase in the cloud computing configuration. The system 100 may use default values for the time-to-market of the computing component, the ideal design capacity of the computing component, and the minimum refresh period. For example, the default value for the time-to-market may be one year, which may include procurement and implementation. The default value for the ideal design capacity may be under eighty percent, while the default value for the minimum refresh period may be three years. Alternatively or in addition, the system 100 may provide the user A 120A with an interface for modifying the default values. If the number of users of a data center is forecasted to change across the transition period, the system 100 may use a linear calculation to estimate the processing requirements of the subsequent time intervals of the transition period.

The system 100 may incorporate the minimum refresh period into the transition strategy generation to ensure the transition meets the organization's technology refresh constraints. The system 100 may determine the expected computing and storage requirements for each time interval of the transition period. If the expected compute or storage requirements for a given time interval are greater than the compute or storage capacity of the time interval, then the system may need to increase the compute or storage capacities of the time interval. The system 100 may determine if the amount of time elapsed since the previous equipment refresh is greater than the minimum refresh period. If the period of time is greater than the minimum refresh period, then the system 100 may increase the compute and storage capacity of the time interval. If the elapsed time since the previous equipment refresh is not greater than the minimum refresh period, then the system 100 may modify the previous time interval in the transition strategy to account for the additional compute or storage capacity required by the time interval.

At step 550, the system 100 provides the transition strategy to the user A 120A. The system 100 may provide the transition strategy to the user A 120A in the form of a graph, a report, or generally any manner of displaying the transition strategy. Alternatively or in addition the system 100 may provide the user A 120A with a user interface to modify the transition strategy. The user interface may allow the user A 120A to modify each time interval, or wave, in the transition strategy.

Figure 6:
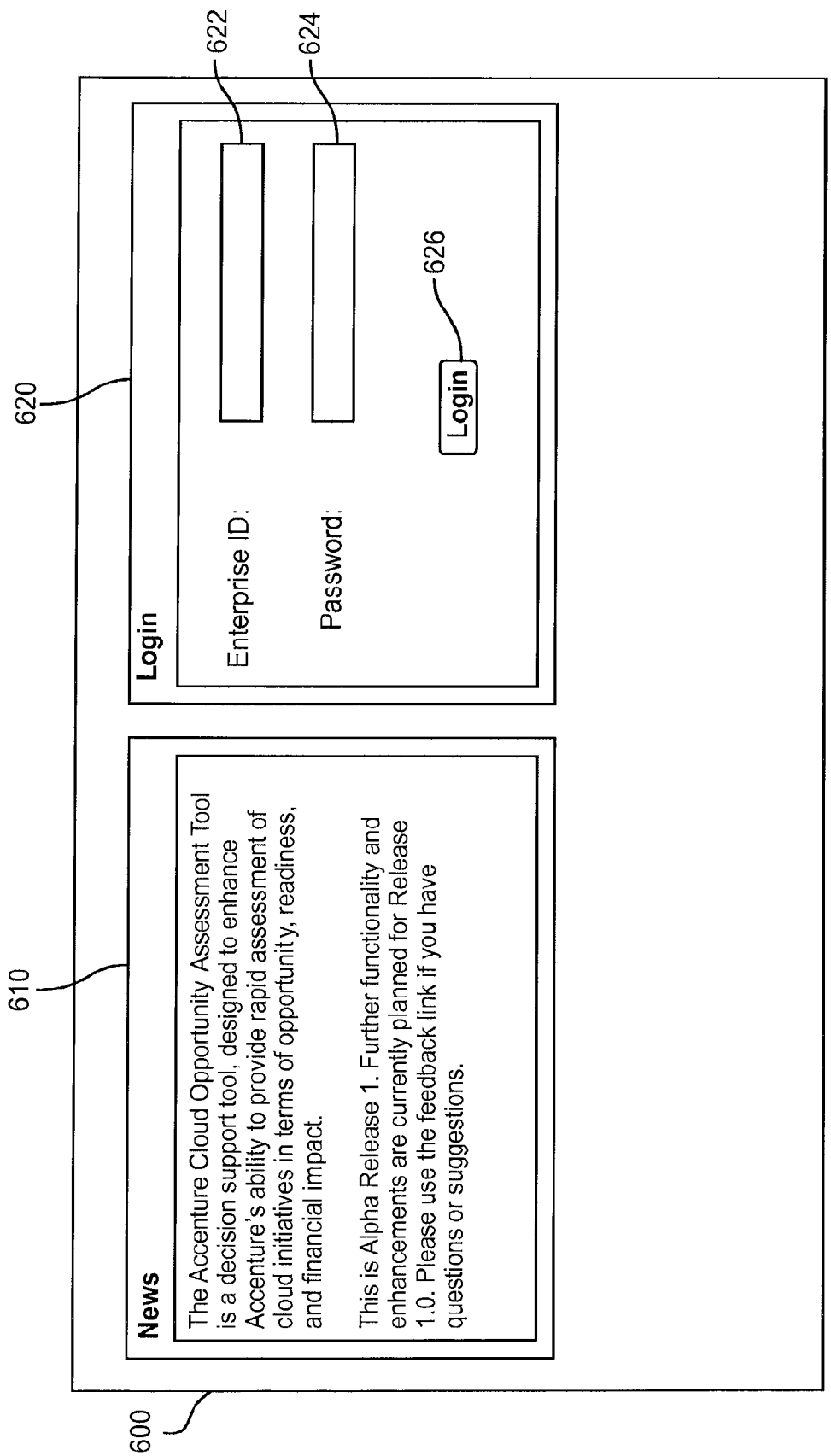
FIG. 6 is a screenshot of a user interface for inputting login data in the system of FIG. 1, or other systems for providing a cloud computing assessment tool.

FIG. 6 is a screenshot of a user interface 600 for inputting login data in the system of FIG. 1, or other systems for providing a cloud computing assessment tool. The service provider server 240 may display the user interface 600 to the user A 120A when the user A 120A first interacts with the system 100. The user A 120A may use the user interface 600 to enter login credentials and access the system 100. The user interface 600 may include a news subsection 610 and a login subsection 620. The login subsection 620 may include a login field 622, a password field 624, and a submit button 626.

The user A 120A may enter a login in the login field 624 and a password in the password field 624, and then click the submit button 626 to login to the system 100. The news subsection 610 may display one or more news items related to the system 100.

FIG. 7 is a screenshot of a user interface 700 for managing organization information in the system of FIG. 1, or other systems for providing a cloud computing assessment tool. The service provider server 240 may display the user interface 700 to the user A 120A when the user A 120A submits proper login credentials in the login subsection 620 in the user interface 600. The user A 120A may use the user interface 700 to select manage one or more organizations, or clients, the user A 120A is responsible for. The user interface 700 may include a client table 710, a add client button 720, view client button 730, delete client button 740, and generate report button 750.

The user A 120A may view the organizations in the client table 710 and may add a new organization by clicking on the add client button 720. The user A 120A may view additional details about an organization by selecting the organization in the client table 710 and clicking on the view client button 730. The user A 120A may delete an organization from the system by selecting the organization in the client table 710 and clicking on the delete client button 740. The user A 120A may generate a report on an organization by selecting an organization in the client table and clicking on the generate report button 750.

FIG. 8 is a screenshot of a user interface 800 for adding an organization in the system of FIG. 1, or other systems for providing a cloud computing assessment tool. The service provider server 240 may display the user interface 800 to the user A 120A when the user A 120A clicks on the add client button 720 in the user interface 700. The user A 120A may use the user interface 800 to add an organization to the system 100. The user interface 800 may include an add client subsection 810. The add client subsection 810 may include a client name field 816, a notes field 818, a submit button 812 and a cancel button 814.

The user A 120A may input the name of an organization into the client name field 816 and may input notes related to the organization in the notes field 818. The user A 120A may add the organization to the system 100 by clicking on the submit button 812. The user A 120A may cancel adding the organization to the system 100 by clicking on the cancel button 814.

Figure 9:
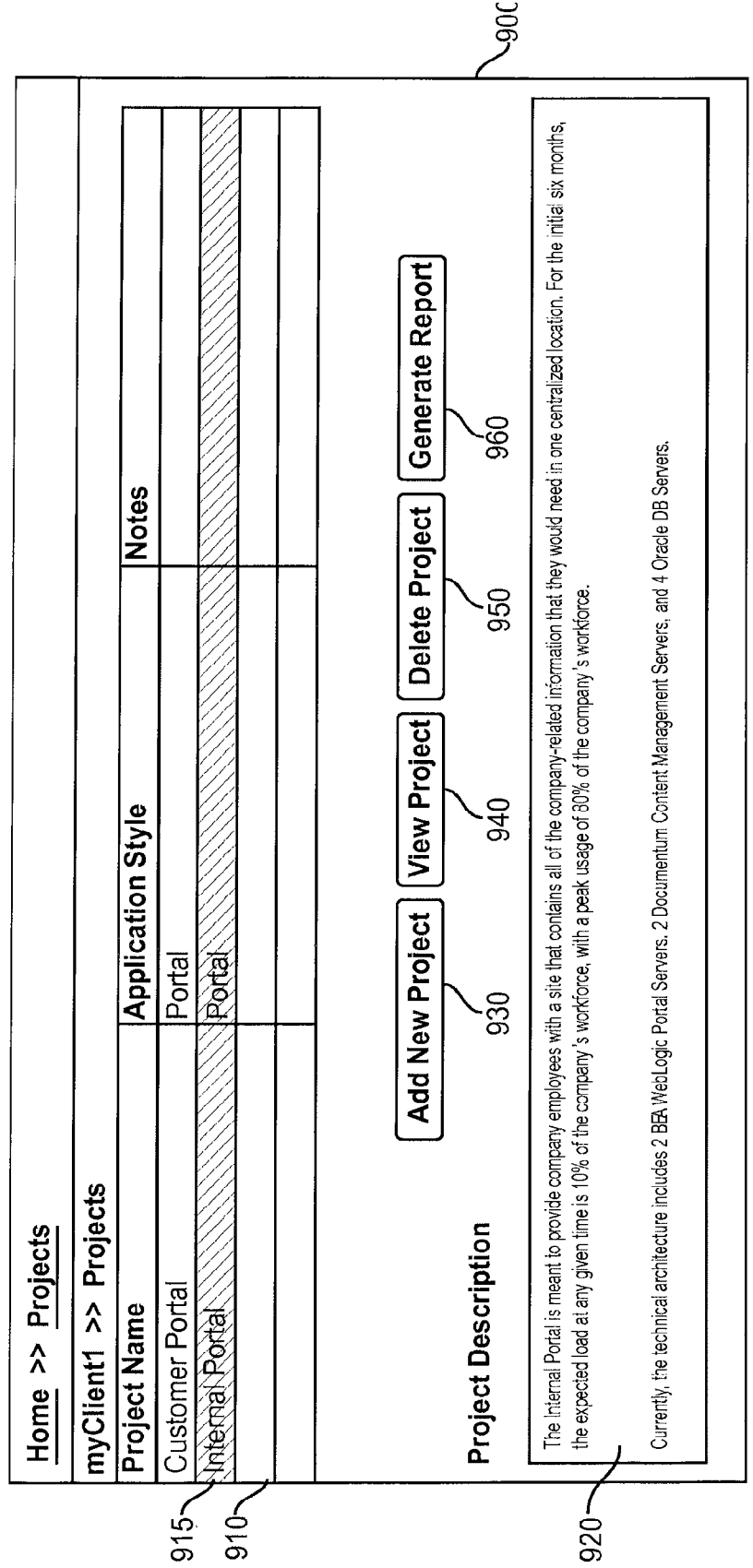
FIG. 9 is a screenshot of a user interface for managing project information in the system of FIG. 1, or other systems for providing a cloud computing assessment tool.

FIG. 9 is a screenshot of a user interface 900 for managing project information in the system of FIG. 1, or other systems for providing a cloud computing assessment tool. The service provider server 240 may display the user interface 900 to the user A 120A when the user A 120A selects an organization in the client table 710 and clicks on the view client button 730 in the user interface 700. The user A 120A may use the user interface 900 to manage projects associated with the organization selected in the user interface 700. The user interface 900 may include a projects table 910, a project description field 920, an add project button 930, a view project button 940, a delete project 950 and a generate report button 960. The projects table 910 may include a selected project 915.

The user A 120A may view the projects associated with the selected organization in the projects table 910. The user A 120A may select a project from the project table and may view a description of the selected project 915 in the project description field 920. The user A 120A may add a new project by clicking on the add project button 930. The user A 120A may view the selected project 915 by clicking on the view project button 940. The user A 120A may delete the selected project 915 by clicking on the delete project button 950. The user A 120A may generate a report describing the selected project 915 by clicking on the generate report button 960.

Figure 10:
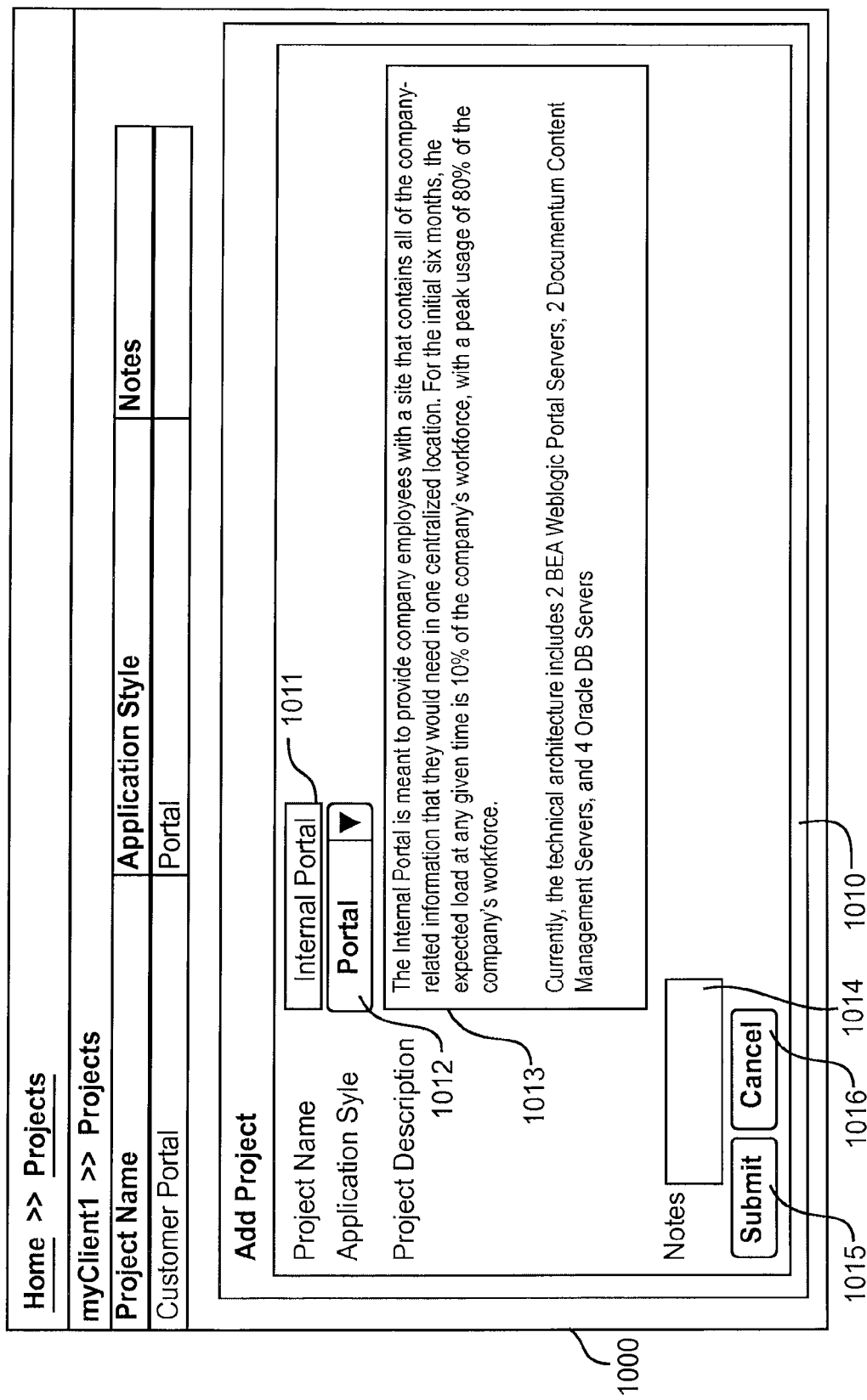
FIG. 10 is a screenshot of a user interface for adding a project in the system of FIG. 1, or other systems for providing a cloud computing assessment tool.

FIG. 10 is a screenshot of a user interface 1000 for adding a project in the system of FIG. 1, or other systems for providing a cloud computing assessment tool. The service provider server 240 may display the user interface 1000 to the user A 120A when the user A 120A clicks on the add project button 930 in the user interface 900. The user A 120A may use the user interface 1000 to add a project to the system 100. The user interface 1000 may include an add project subsection 1010. The add project subsection 1010 may include a project name field 1011, an application style selector 1012, a project description field 1013, a notes field 1014, a submit button 1015, and a cancel button 1016.

The user A 120A may input a project name in the project name field 1010, a project description in the description field 1013, and project notes in the notes field 1014. The user A 120A may select an application style with the application style selector 1012. Some application styles may include a portal, an application integration, a batch, an online transaction processing, a business intelligence, or a backup storage. The user A 120A may add the project to the system 100 by clicking on the submit button 1015. The user A 120A may cancel the process of adding the project by clicking on the cancel button 1016.

FIG. 11 is a screenshot of a user interface 1100 for managing profile information in the system of FIG. 1, or other systems for providing a cloud computing assessment tool. The service provider server 240 may display the user interface 1100 to the user A 120A when the user A 120A clicks on view project button 940 in the user interface 900. The user A 120A may use the user interface 1100 to manage profiles describing one or more computing components. The user interface 1100 may include a profile table 1110, a add profile button 1120, a copy profile button 1130, a share profile button 1140, and a delete profile button 1140.

The user A 120A can view the profiles for the project selected in the user interface 900 in the profiles table 1110. The user A 120A may add a profile to the profile table 1110 by clicking on the add profile button 1120. The user A 120A may copy a profile by selecting a profile in the profile table and clicking on the copy profile button 1130. The user A 120A may share a profile by selecting a profile in the profile table 1110 and clicking on the share profile button 1140. A user A 120A may delete a profile by selecting a profile in the profile table 1110 and clicking on the delete profile button 1150.

FIG. 12 is a screenshot of a user interface 1200 for adding a profile in the system of FIG. 1, or other systems for providing a cloud computing assessment tool. The service provider server 240 may display the user interface 1200 to the user A 120A when the user A 120A clicks on the add profile button 1120 in the user interface 1100. The user A 120A may use the user interface 1200 to add a profile to the system 100. The user interface 1200 may include an add profile subsection 1210. The add profile subsection 1210 may include a profile name field 1211, a client contact field 1212, a notes field 1213, a submit button 1214, and a cancel button 1215.

The user A 120A may input a profile name to the profile name field 1211, a client contact to the client contact field 1212, and notes to the notes field 1213. The user A 120A may add the profile to the system 100 by clicking on the submit button 1214. The user A 120A may cancel adding the profile to the system 100 by clicking on the cancel button 1215.

FIG. 13 is a screenshot of a user interface 1300 for inputting data center characteristics in the system of FIG. 1, or other systems for providing a cloud computing assessment tool. The user A 120A may use the user interface 1300 to input requirements of a computing component. The user interface 1300 may include a question subsection 1310. The question subsection 1310 may include one or more questions.

The user A 120A may answer one or more questions in questions subsection 1310. The questions may provide the system 100 with additional information regarding the computing component to be transitioned to cloud computing. The questions may determine the environment to assess cloud-readiness for, such as a production environment, the operating system requirements of the computing component, whether the computing component is open source or commercial, whether the computing component is an existing implementation or a Greenfield implementation, the acceptable amount of downtime, the expected time to market, and generally any questions which may help define the computing component to be transitioned to cloud computing.

FIG. 14 is a screenshot of a user interface 1400 for viewing a cloud computing assessment in the system of FIG. 1, or other systems for providing a cloud computing assessment tool. The user A 120A may use the user interface 1400 to view the cloud computing assessment. The user interface 1400 may include a cloud provider selector 1410, a cloud goal selector 1420, an opportunity score table 1430, a readiness score table 1440, and an overall score subsection 1450. The opportunity score table may include a selected question category 1435. The overall score subsection 1450 may include a recommendations field 1455.

The user A 120A may view the opportunity scores and the readiness scores associated with the question categories in the opportunity score table 1430 and the readiness score table 1440. The score values may be represented by one or more graphical items, such as stars. The overall score subsection 1450 may display the overall opportunity and readiness score values. The user A 120A may select a question category from the opportunity score table 1430 or the readiness score table 1440, such as the selected question category 1435. When the user A 120A selects a question category, the recommendations field 1455 may display recommendations related to the question category and the readiness or opportunity score.

FIG. 14A is a screenshot of an alternative user interface 1400 for viewing a cloud computing assessment in the system of FIG. 1, or other systems for providing a cloud computing assessment tool. The user A 120A may use the user interface 1400 to view the cloud computing assessment. The user interface 1400 may include a cloud provider selector 1410, a cloud goal selector 1420, an overall score subsection 1450, an evaluation criteria subsection 1460, a score subsection 1470, and a legend subsection 1480. The overall score subsection 1450 may include a recommendations field 1455.

The user A 120A may view the evaluation criteria in the evaluation criteria subsection 1460, and individual scores in a score subsection 1470. The score values may be represented by one or more graphical items, such as stars. The color levels, or shades, of the stars may differ to demonstrate the perception associated with a given score. For example, high scores may be associated with green stars, medium scores may be associated with yellow stars and low scores may be associated with red stars. The overall score subsection 1450 may display the overall opportunity and readiness score values. The recommendations field 1455 may display recommendations related to an evaluation criteria in the evaluation criteria subsection 1460.

Figure 15:
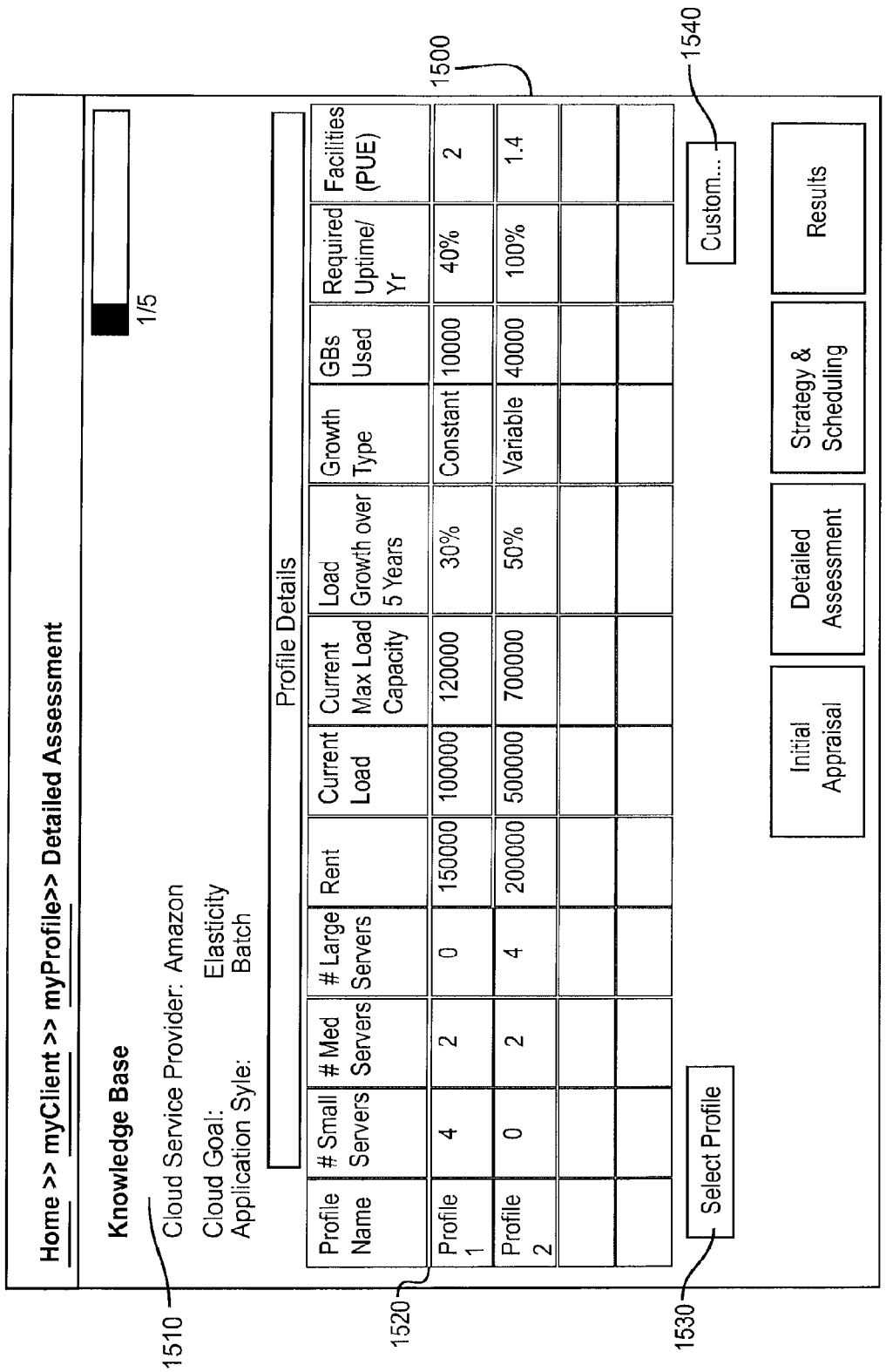
FIG. 15 is a screenshot of a user interface for viewing a detailed cloud computing assessment in the system of FIG. 1, or other systems for providing a cloud computing assessment tool.

FIG. 15 is a screenshot of a user interface 1500 for viewing a detailed cloud computing assessment in the system of FIG. 1, or other systems for providing a cloud computing assessment tool. The user A 120A may use the user interface 1500 to view detailed assessment information. The user interface 1500 may include a knowledge base subsection 1510, a profile table 1520, a select profile button 1530, and a custom button 1540.

The user A 120A may view detailed information about the profile in the knowledge base subsection 1510, such as the selected cloud computing provider, the selected cloud goal, and the selected application style. The profile table 1520 may include information about the profiles in the system 100, such as the number of servers associated with a profile, the rent associated with a profile, the current load associated with the profile, the maximum load capacity associated with the profile, the load growth associated with the profile, the storage requirements associated with a profile, the required uptime associated with the profile, and the facilities associated with a profile. The user A 120A may select a profile by clicking on the select profile button 1530 and may customize a profile by clicking on the custom button 1540.

FIG. 16 is a screenshot of a user interface 1600 for inputting compute requirements of a computing component in the system of FIG. 1, or other systems for providing a cloud computing assessment tool. The service provider server 240 may display the user interface 1600 to the user A 120A when the user A 120A clicks on the custom button 1540 in the user interface 1500. The user A 120A may use the user interface 1600 to input detailed computing requirements of a computing component. The user interface 1600 may include a tabset 1610, a data center subsection 1620, a cloud subsection 1640, an overall subsection 1630, a conversion calculator button 1650, and a submit button 1660. The data center subsection 1620 may include a small servers field 1621, a medium servers field 1622, a large servers field 1623, a monthly rent field 1624, and a facilities field 1625. The data center subsection 1620 may also include fields for other similar metrics, such as a number of servers field, a number of central processing unit (CPU) cores per processor field, a number of CPU processors per server field, a gigabytes of random access memory (RAM) field, and a server power rating field. The data center subsection 1620 may also allow users to browse a pre-populated database containing the required information. The cloud subsection 1640 may include a small instances field 1641, a large instances field 1642, an extra-large instances field 1643, a high-CPU medium instance field 1644, and a high CPU extra large instance field 1645. The overall subsection 1630 may include a max load capacity field 1632 and an actual load field 1634.

The user A 120A may input information describing the configuration of the data center for the wave in the data center subsection 1620. The user A 120A may input information describing the cloud configuration for the wave in the cloud subsection 1640. The user A 120A may input the overall compute requirements for the wave in the overall subsection 1630. The user A 120A may click on the conversion calculator button 1650 to access a calculator for converting between data center infrastructure and cloud infrastructure. The user A 120A may submit the inputted data by clicking on the submit button 1660.

FIG. 16A is a screenshot of an alternative user interface 1600 for inputting compute requirements of a computing component in the system of FIG. 1, or other systems for providing a cloud computing assessment tool. The service provider server 240 may display the user interface 1600 to the user A 120A when the user A 120A clicks on the custom button 1540 in the user interface 1500. The user A 120A may use the user interface 1600 to input detailed computing requirements of a computing component. The user interface 1600 may include a tabset 1610, a data center subsection 1620, an overall subsection 1630, a conversion calculator button 1650, and a submit button 1660. The data center subsection 1620 may include a CPU processing speed field 1671, a number of CPU cores per processor field 1672, a number of CPU processors per server field 1673, an amount of random access memory (RAM) field 1674, a server power rating field 1675, a browse button 1676, a number of servers field 1677, a monthly rent field 1624, and a facilities field 1625. The overall subsection 1630 may include a max load capacity field 1632.

The user A 120A may input information describing the configuration of the data center for the wave in the data center subsection 1620. The user A 120A may browse a pre-populated database containing data center configuration information by clicking on the browse button 1676. The user A 120A may input the overall compute requirements for the wave in the overall subsection 1630. The user A 120A may click on the conversion calculator button 1650 to access a calculator for converting between data center infrastructure and cloud infrastructure. The user A 120A may submit the inputted data by clicking on the submit button 1660.

Figure 17:
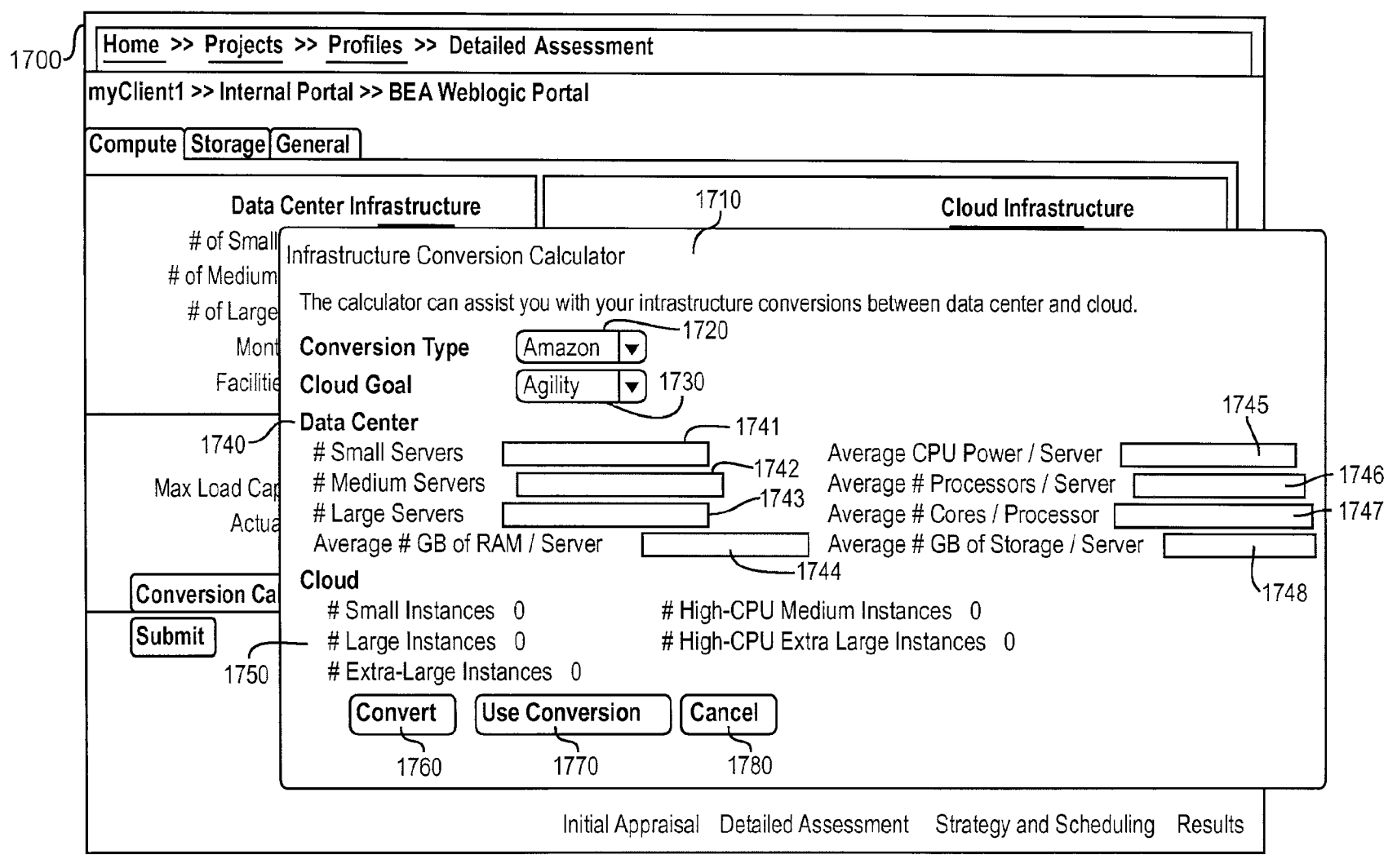

FIG. 17 is a screenshot of a user interface 1700 for converting data center and cloud computing infrastructure data in the system of FIG. 1, or other systems for providing a cloud computing assessment tool. The service provider server 240 may display the user interlace 1700 to the user A 120A when the user A 120A clicks on the conversion calculator button 1650 in the user interface 1600. The user A 120A may use the user interface 1700 to select an initiative to determine the number of cloud instances equivalent to a data center infrastructure. The user interface 1700 may include a conversion type selector 1720, a cloud goal selector 1730, a data center subsection 1740, a cloud subsection 1750, a convert button 1760, a use conversion button 1770 and a cancel button 1780. The data center subsection 1740 may include a small servers field 1741, a medium servers field 1742, a large servers field 1743, a average memory field 1744, an average CPU power field 1745, a average number of processors field 1746, an average number of cores field 1747, and an average memory field 1748.

The user A 120A may input information describing a data center configuration in the data center subsection 1740. The user A 120A may select a cloud computing provider with the conversion type selector 1720 and may select a cloud goal with the cloud goal selector 1730. When the user A 120A clicks on the convert button 1760, the system 100 displays the equivalent number of cloud instances in the cloud subsection 1750. The user A 120A may use the inputted and conversion data by clicking on the use conversion button 1770. When the user A 120A clicks on the use conversion button 1770, the system 100 may populate the corresponding fields in the user interface 1600. The user A 120A may cancel the conversion by clicking on the cancel button 1780.

FIG. 18 is a screenshot of a user interface 1800 for inputting storage requirements of a computing component in the system of FIG. 1, or other systems for providing a cloud computing assessment tool. The service provider server 240 may display the user interface 1800 to the user A 120A when the user A 120A clicks on the storage tab in the tabset 1810. The user A 120A may use the user interface 1800 to input information describing the storage requirements for the wave. The user interface 1800 may include a data center subsection 1820, a cloud subsection 1840, an overall subsection 1830, a conversion calculator button 1850, and a submit button 1860. The data center subsection 1820 may include a storage used field 1821, an inbound data transfer field 1822, and an outbound data transfer field 1823. The cloud subsection 1840 may include a data used field 1841, an inbound data transfer field 1842, and an outbound data transfer field 1843. The overall subsection 1840 may include a max storage capacity field 1831, a backup prequery field 1832 and a retention time field 1833.

The user A 120A may input the data center storage requirements for the wave in the data center subsection 1820. The user A 120A may input the cloud storage requirements for the wave in the cloud subsection 1840. The user A 120A may input general storage requirements for the wave in the overall subsection 1830. The user A 120A may access a conversion calculator by clicking on the conversion calculator button 1650. The user A 120A may submit the inputted data by clicking on the submit button 1860.

FIG. 19 is a screenshot of a user interface 1900 for inputting general requirements of a computing component in the system of FIG. 1, or other systems for providing a cloud computing assessment tool. The service provider server 240 may display the user interface 1900 to the user A 120A when the user A 120A clicks on the general tab in the tabset 1910. The user A 120A may use the user interface 1900 to input general information describing the wave. The user interface 1900 may include a data center subsection 1920, a cloud subsection 1930, an overall subsection 1940, a conversion calculator button 1950, and a submit button 1960. The data center subsection may include a licensing costs field 1921, a personnel costs field 1922, a physical server reduction ratio field 1928, and a time to market field 1924. The cloud subsection 1930 may include a licensing costs field 1931, a personnel costs field 1932, and a time to market field 1933. The overall subsection 1940 may include an allocation interval selector 1941, a start date field 1942, an end date field 1943, and an other costs field so as to encompass any other costs that have not been explicitly stated.

The user A 120A may input general data center information for the wave in the data center subsection 1920. The user A 120A may input general cloud information for the wave in the cloud subsection 1930. The user A 120A may input general overall information for the wave in the overall subsection 1940. The user A 120A may click on the conversion calculator button 1950 to access a conversion calculator. The user A 120A may submit the inputted information by clicking on the submit button 1960.

Figure 20:
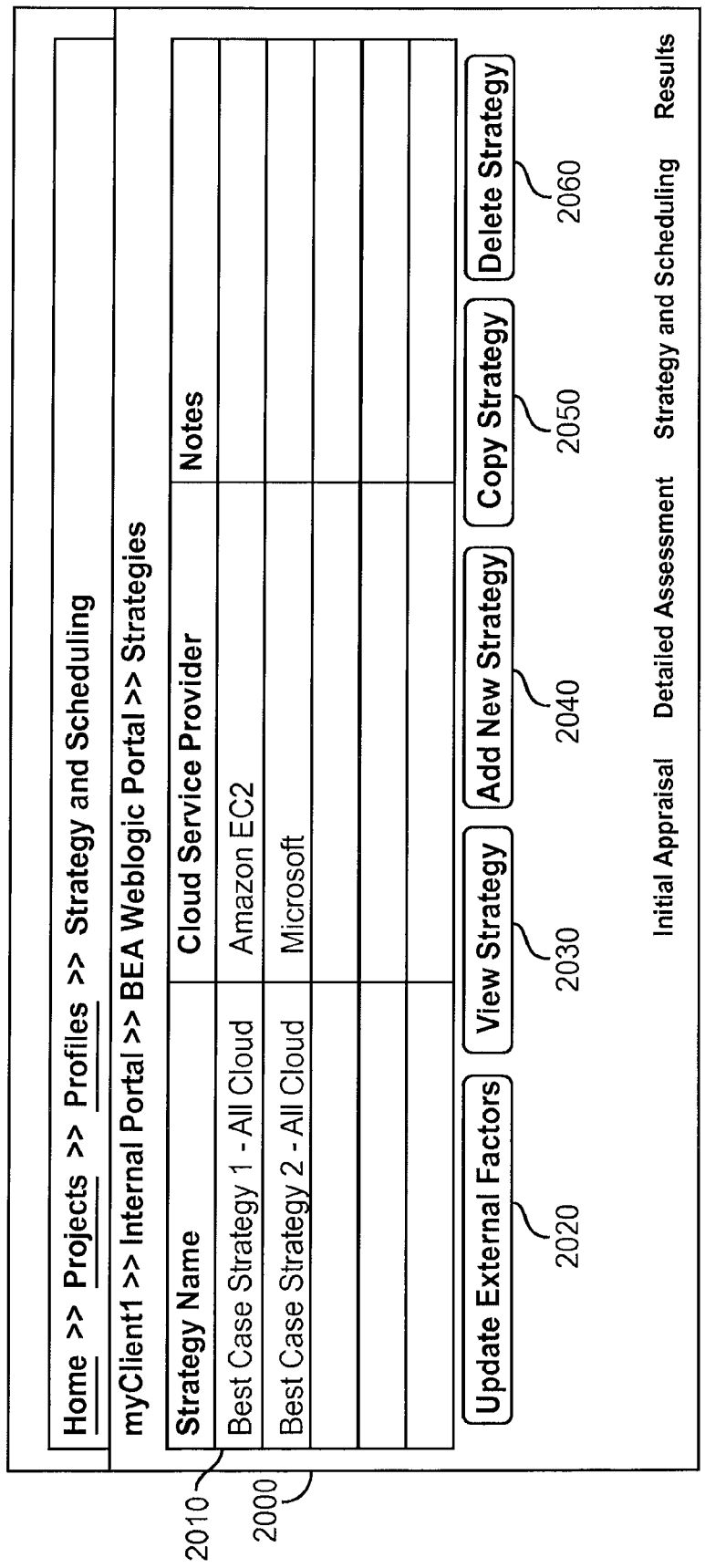
FIG. 20 is a screenshot of a user interface for managing strategies in the system of FIG. 1, or other systems for providing a cloud computing assessment tool.

FIG. 20 is a screenshot of a user interface 2000 for managing strategies in the system of FIG. 1, or other systems for providing a cloud computing assessment tool. The user A 120A may use the user interface 2000 to manage strategies. The user interface 2000 may include a strategy table 2010, an update external factors button 2020, a view strategy button 2030, an add strategy button 2040, a copy strategy button 2050, and a delete strategy button 2060.

The user A 120A may view the strategies in the system 100 in the strategy table 2010. The strategy table may display the strategy name, the cloud computing provider for the strategy and any notes for the strategy. The user A 120A may update the trend values for a strategy by selecting the strategy in the strategy table 2010 and clicking on the update external factors button 2020. The user A 120A may view strategy details by selecting a strategy in the strategy table 2010 and clicking on the view strategy button 2030. The user A 120A may copy a strategy by selecting a strategy in the strategy table 2010 and clicking on the copy strategy button 2050. The user A 120A may delete a strategy by selecting a strategy in the strategy table 2010 and clicking on the delete button 2060. The user A 120A may add a strategy to the strategy table 2010 by clicking on the add strategy button 2040.

Figure 21:
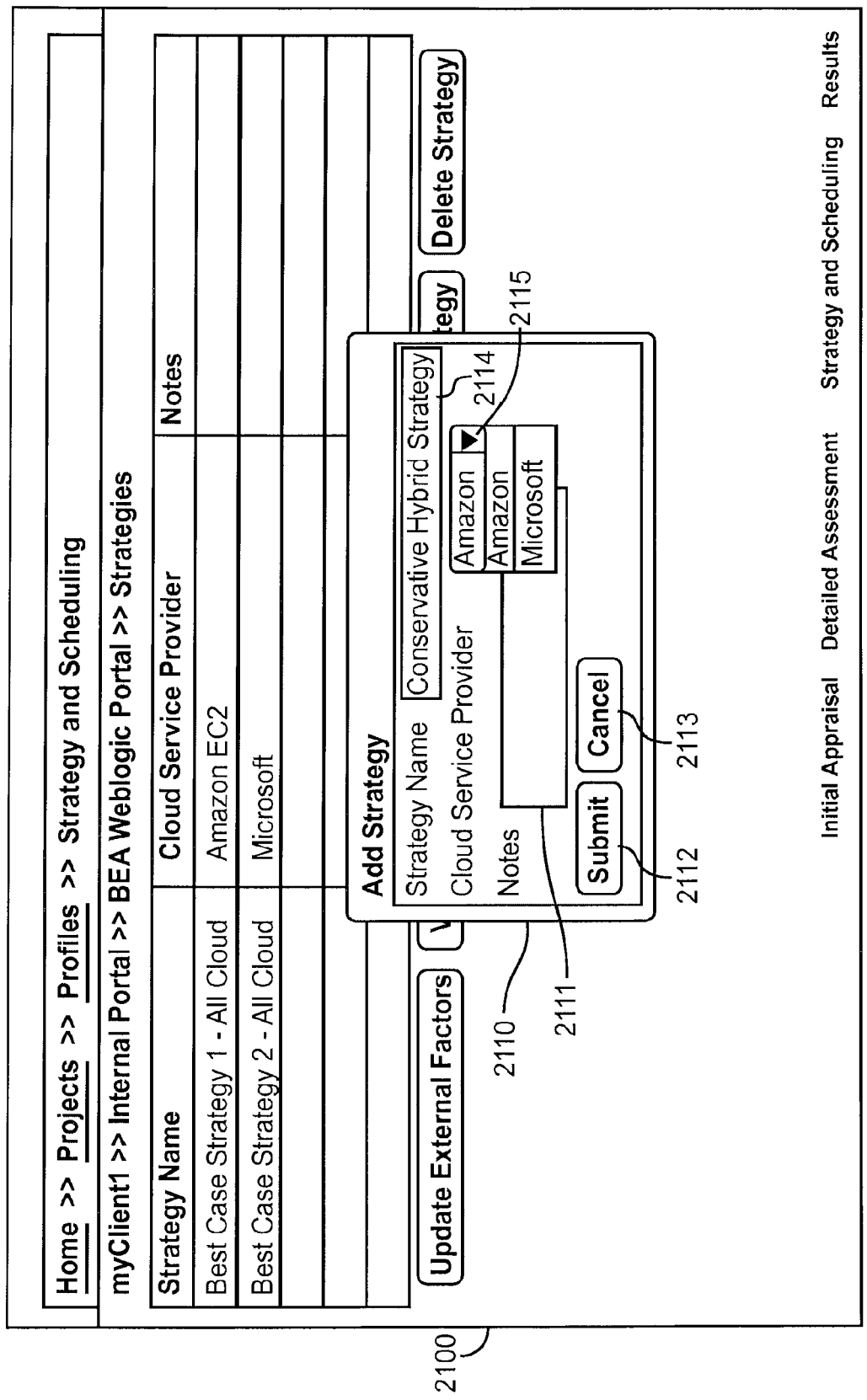
FIG. 21 is a screenshot of a user interface for adding strategies in the system of FIG. 1, or other systems for providing a cloud computing assessment tool.

FIG. 21 is a screenshot of a user interface 2100 for adding strategies in the system of FIG. 1, or other systems for providing a cloud computing assessment tool. The service provider server 240 may display the user interface 2100 to the user A 120A when the user A 120A clicks on the add strategy button 2040 in the user interface 2000. The user A 120A may use the user interface 2100 to add a strategy to the system 100. The user interface 2100 may include an add strategy subsection 2110. The add strategy subsection 2110 may include a strategy name field 2114, a cloud computing provider selector 2115, a notes field 2111, a submit button 2112, and a cancel button 2113.

The user A 120A may input the name of a strategy in the strategy name field 2114 and may input any notes for the strategy in the notes field 2111. The user A 120A may select a cloud computing provider for the strategy using the cloud computing provider selector 2115. The user A 120A may submit the new strategy to the system 100 by clicking on the submit button 2112, or the user A 120A may cancel adding the strategy to the system 100 by clicking on the cancel button 2113.

FIG. 22 is a screenshot of a user interface 2200 for managing trend values in the system of FIG. 1, or other systems for providing a cloud computing assessment tool. The service provider server 240 may display the user interface 2200 to the user A 120A when the user A 120A clicks on the update external factors button 2020 in the user interface 2000. The user A 120A may use the user interface 2200 to manage external factor values for the selected strategy. The user interface 2200 may include an external factors table 2110, an external factor graph 2220, and a submit button 2230. The external factors table may include a selected external factor 2215. The external factor graph 2220 may include a legend 2222, and a data line 2225.

The user A 120A may input the trend values for a time period in the external factors table 2210. The user A 120A may input the start of a time period, the actual load required, the amount of energy required, the server power rating and the server cost for the period of time. The user A 120A may select a time period row in the external factors table 2210 and view a graphical display of the data in the external factor graph 2220. The external factor data may be displayed as the data line 2225, and the legend 2222 may indicate the external factor being graphed. The user A 120A may submit modifications to the trend values by clicking on the submit button 2230.

FIG. 23 is a screenshot of a report screen 2300 in the system of FIG. 1, or other systems for providing a cloud computing assessment tool. The service provider server 240 may display the report screen 2300 to the user A 120A when the user A 120A clicks on the view strategy button 2030 in the user interface 2000. The user A 120A may use the report screen 2300 to view a graphical display of cloud data for a strategy. The report screen 2300 may include a legend 2310, a graph 2320, a financial impact subsection 2330, a return button 2340, an add wave button 2350, an edit wave button 2360, and a remove wave button 2370. The graph 2320 may include a current max load line 2324, a waves line 2326, and an actual load area 2322.

The user A 120A may view the actual load data, the waves data, and the current max load data in the graph 2320. The current max load data may be represented by the current max load line 2324, the waves data may be represented by the waves line 2326 and the actual load data may be represented by the actual load area 2322. The user A 120A may view the financial impact of the wave in the financial impact subsection 2330. The user A 120A may add a wave to the strategy by clicking on the add wave button 2350, the user A 120A may edit a wave by clicking on the edit wave button 2360, and the user A 120A may remove a wave by clicking on the remove wave button 2370. The user A 120A may return to the user interface 2000 by clicking on the return button 2340.

FIG. 24 is a screenshot of a user interface 2400 for inputting compute requirements for a time interval in the system of FIG. 1, or other systems for providing a cloud computing assessment tool. The service provider server 240 may display the user interface 2400 to the user A 120A when the user A 120A clicks on the edit wave button 2370 in the user interface 2300. The user A 120A may use the user interface 2400 to edit the compute requirements for a wave. The user interface 2400 may also be used to input compute requirements for a new wave in the system 100. The user interface 2400 may include an edit wave subsection 2410. The edit wave subsection 2410 may include a wave selector 2420, a tabset 2430, a data center subsection 2440, a cloud subsection 2460, an overall subsection 2450, a conversion calculator button 2470, a submit button 2480, and a cancel button 2490. The data center subsection 2440 may include a small servers field 2441, a medium servers field 2442, a large servers field 2443, a monthly rent field 2444, and a facilities field 2445. The data center subsection 2440 may also include fields for other similar metrics, such as a number of servers field, a number of CPU cores per processor field, a number of CPU processors per server field, a gigabytes of RAM field, and a server power rating field. The data center subsection 2440 may also allow users to browse a pre-populated database containing the required information. The cloud subsection 2460 may include a small instances field 2461, a large instances field 2462, an extra-large instances field 2463, a high-CPU medium instance field 2464, and a high CPU extra large instance field 2465. The overall subsection 2450 may include a max load capacity field 2451 and an actual load field 2452.

The user A 120A may input information describing the configuration of the data center for the wave in the data center subsection 2440. The user A 120A may input information describing the cloud configuration for the wave in the cloud subsection 2460. The user A 120A may input the overall compute requirements for the wave in the overall subsection 2450. The user A 120A may click on the conversion calculator button 2470 to access a calculator for converting between data center infrastructure and cloud infrastructure. The user A 120A may submit the inputted data by clicking on the submit button 2480. The user A 120A may cancel the process by clicking on the cancel button 2490. The user A 120A may change the wave being edited by clicking on the wave selector 2420. If the user A 120A is adding a new wave the wave selector 2420 may not be visible on the user interface 2400.

Figure 24A:
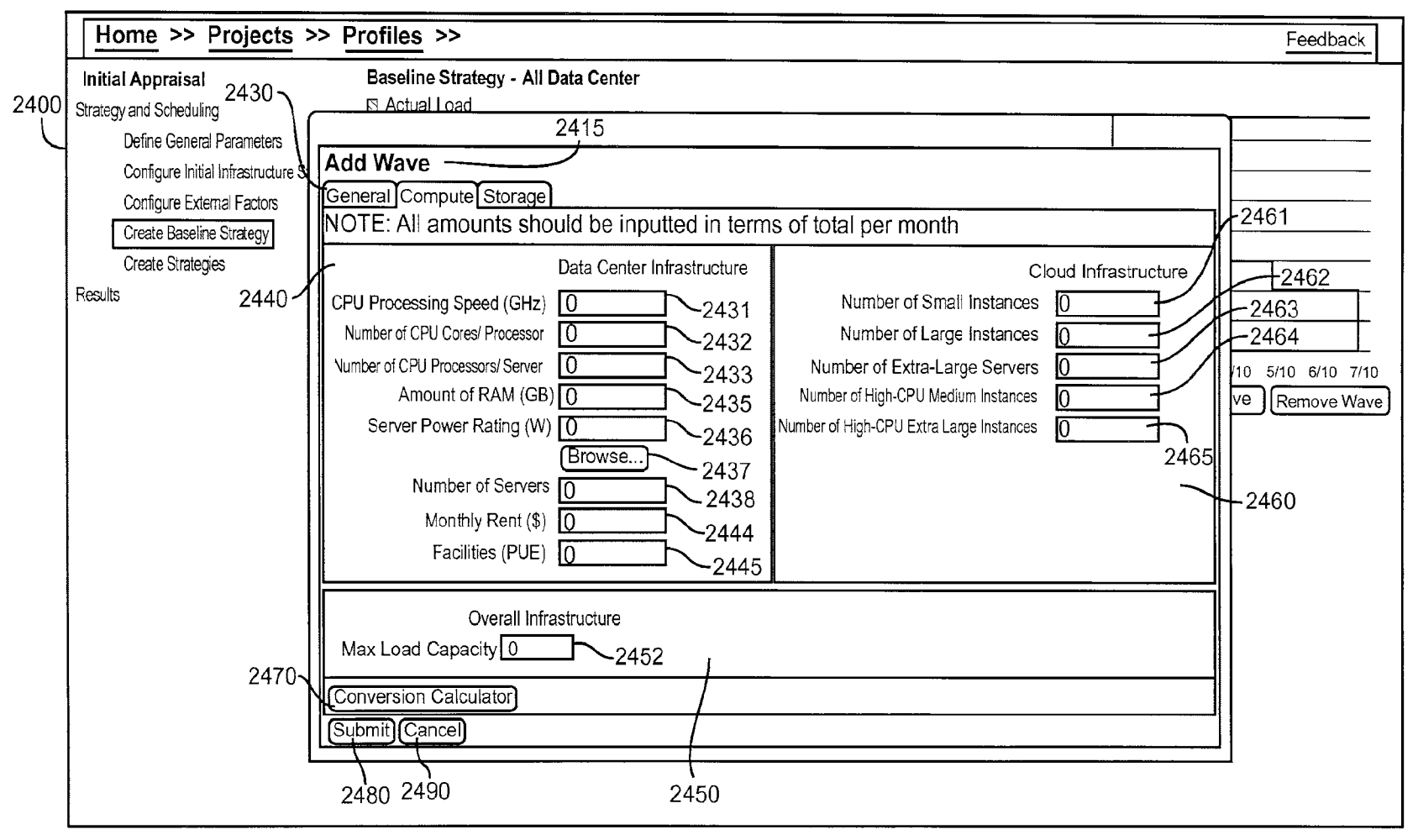

FIG. 24A is a screenshot of an alternative user interface 2400 for inputting compute requirements for a time interval in the system of FIG. 1, or other systems for providing a cloud computing assessment tool. The service provider server 240 may display the user interface 2400 to the user A 120A when the user A 120A clicks on the add wave button 2350 in the user interface 2300. The user A 120A may use the user interface 2400 to add the compute requirements for a wave. The user interface 2400 may also be used to input compute requirements for a new wave in the system 100. The user interface 2400 may include an add wave subsection 2415. The add wave subsection 2415 may include, a tabset 2430, a data center subsection 2440, a cloud subsection 2460, an overall subsection 2450, a conversion calculator button 2470, a submit button 2480, and a cancel button 2490. The data center subsection 2440 may include a CPU processing speed field 2431, a number of CPU cores per processor field 2432, a number of CPU processors per server field 2433, an amount of random access memory (RAM) field 2435, a server power rating field 2436, a browse button 2437, a number of servers field 2438, a monthly rent field 2444, and a facilities field 2445. The cloud subsection 2460 may include a small instances field 2461, a large instances field 2462, an extra-large instances field 2463, a high-CPU medium instance field 2464, and a high CPU extra large instance field 2465. The overall subsection 2450 may include a max load capacity field 2451.

The user A 120A may input information describing the configuration of the data center for the wave in the data center subsection 2440. The user A 120A may browse a pre-populated database containing data center configuration information by clicking on the browse button 2437. The user A 120A may input information describing the cloud configuration for the wave in the cloud subsection 2460. The user A 120A may input the overall compute requirements for the wave in the overall subsection 2450. The user A 120A may click on the conversion calculator button 2470 to access a calculator for converting between data center infrastructure and cloud infrastructure. The user A 120A may submit the inputted data by clicking on the submit button 2480. The user A 120A may cancel the process by clicking on the cancel button 2490.

FIG. 25 is a screenshot of a user interface 2500 for inputting storage requirements for a time interval in the system of FIG. 1, or other systems for providing a cloud computing assessment tool. The service provider server 240 may display the user interface 2500 to the user A 120A when the user A 120A clicks on the storage tab in the tabset 2530. The user A 120A may use the user interface 2500 to input storage requirements for the selected wave. The user interface 2500 may include an edit wave subsection 2510. The edit wave subsection 2510 may include a wave selector 2520, a tabset 2530, a data center subsection 2540, a cloud subsection 2550, an overall subsection 2560, a conversion calculator button 2570, a submit button 2580, and a cancel button 2590. The data center subsection 2540 may include a storage used field 2541, an inbound data transfer field 2542, and an outbound data transfer field 2543. The cloud subsection 2550 may include a storage used field 2551, an inbound data transfer field 2552, and an outbound data transfer field 2553. The overall subsection 2560 may include a max storage capacity field 2561, a backup frequency field 2562 and a retention time field 2563.

The user A 120A may input the data center storage requirements for the wave in the data center subsection 2540. The user A 120A may input the cloud storage requirements for the wave in the cloud subsection 2550. The user A 120A may input the overall storage requirements for the wave in the overall subsection 2560. The user A 120A may click on the conversion calculator button 2570 to access a calculator for converting between data center infrastructure and cloud infrastructure. The user A 120A may submit the inputted data by clicking on the submit button 2580. The user A 120A may cancel the process by clicking on the cancel button 2590. The user A 120A may change the wave being edited by clicking on the wave selector 2520. If the user A 120A is adding a new wave the wave selector 2520 may not be visible on the user interface 2500.

Figure 26:
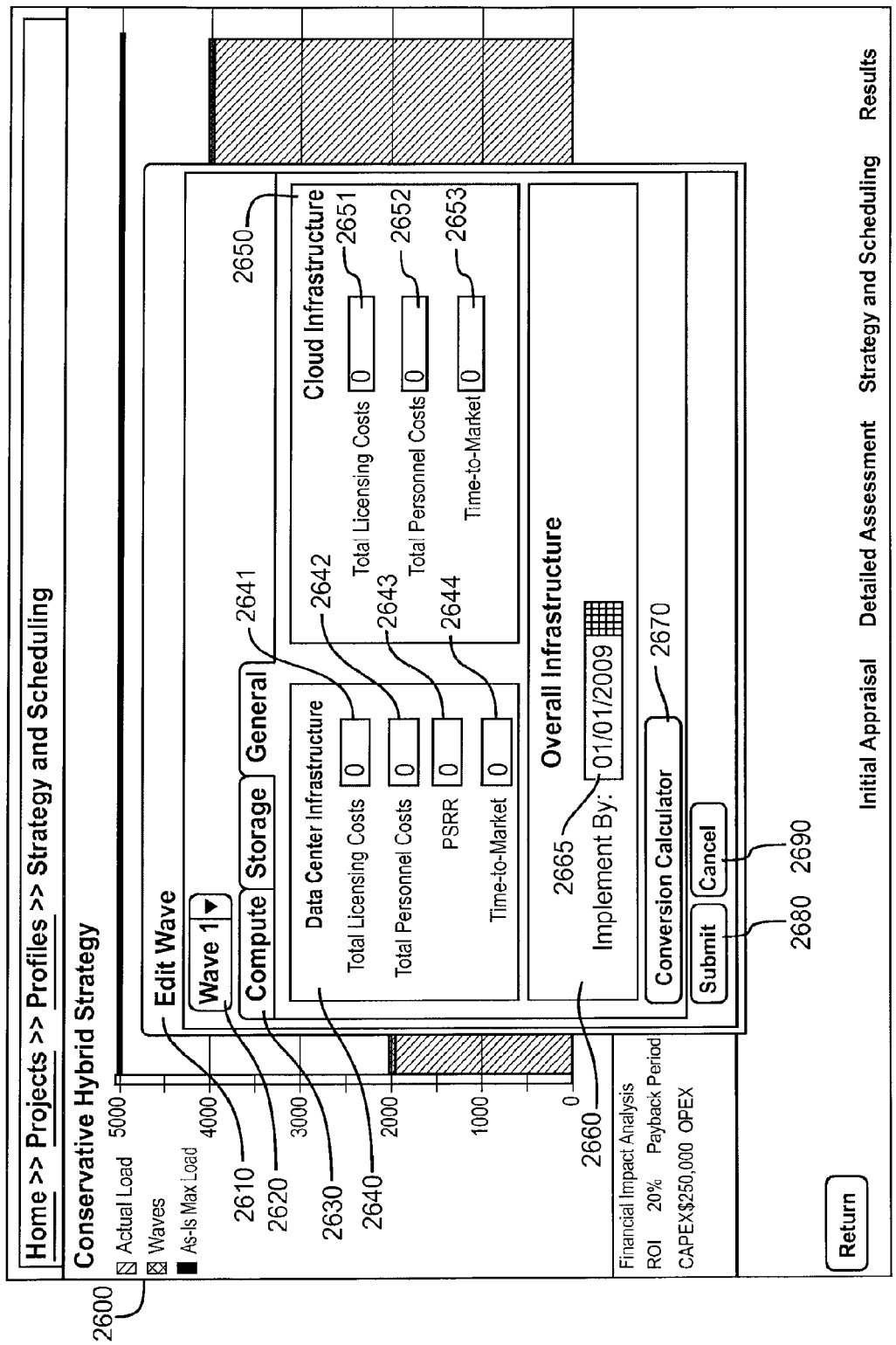
FIG. 26 is a screenshot of a user interface for inputting general requirements for a time interval in the system of FIG. 1, or other systems for providing a cloud computing assessment tool.

FIG. 26 is a screenshot of a user interface 2600 for inputting general requirements for a time interval in the system of FIG. 1, or other systems for providing a cloud computing assessment tool. The service provider server 240 may display the user interface 2600 to the user A 120A when the user A 120A clicks on the general tab in the tabset 2630. The user A 120A may use the user interface 2600 to input the general requirements for the wave. The user interface 2600 may include an edit wave subsection 2610. The edit wave subsection 2610 may include a wave selector 2620, a tabset 2630, a data center subsection 2640, a cloud subsection 2650, an overall subsection 2660, a conversion calculator button 2670, a submit button 2680, and a cancel button 2690. The data center subsection 2640 may include a licensing costs field 2641, a personnel costs field 2642, a physical server reduction ratio (PSRR) field 2643, and a time to market field 2644. The cloud subsection 2650 may include a licensing cost field 2651, a personnel cost field 2652, and a time-to-market field 2653. The overall subsection 2660 may include an implement by date field 2665.

The user A 120A may input information describing the general data center configuration for the wave in the data center subsection 2640. The user A 120A may input information describing the general cloud configuration for the wave in the cloud subsection 2650. The user A 120A may input the general overall requirements for the wave in the overall subsection 2660. The user A 120A may click on the conversion calculator button 2670 to access a calculator for converting between data center infrastructure and cloud infrastructure. The user A 120A may submit the inputted data by clicking on the submit button 2680. The user A 120A may cancel the process by clicking on the cancel button 2490. The user A 120A may change the wave being edited by clicking on the wave selector 2620. If the user A 120A is adding a new wave the wave selector 2620 may not be visible on the user interface 2600.

Figure 26A:
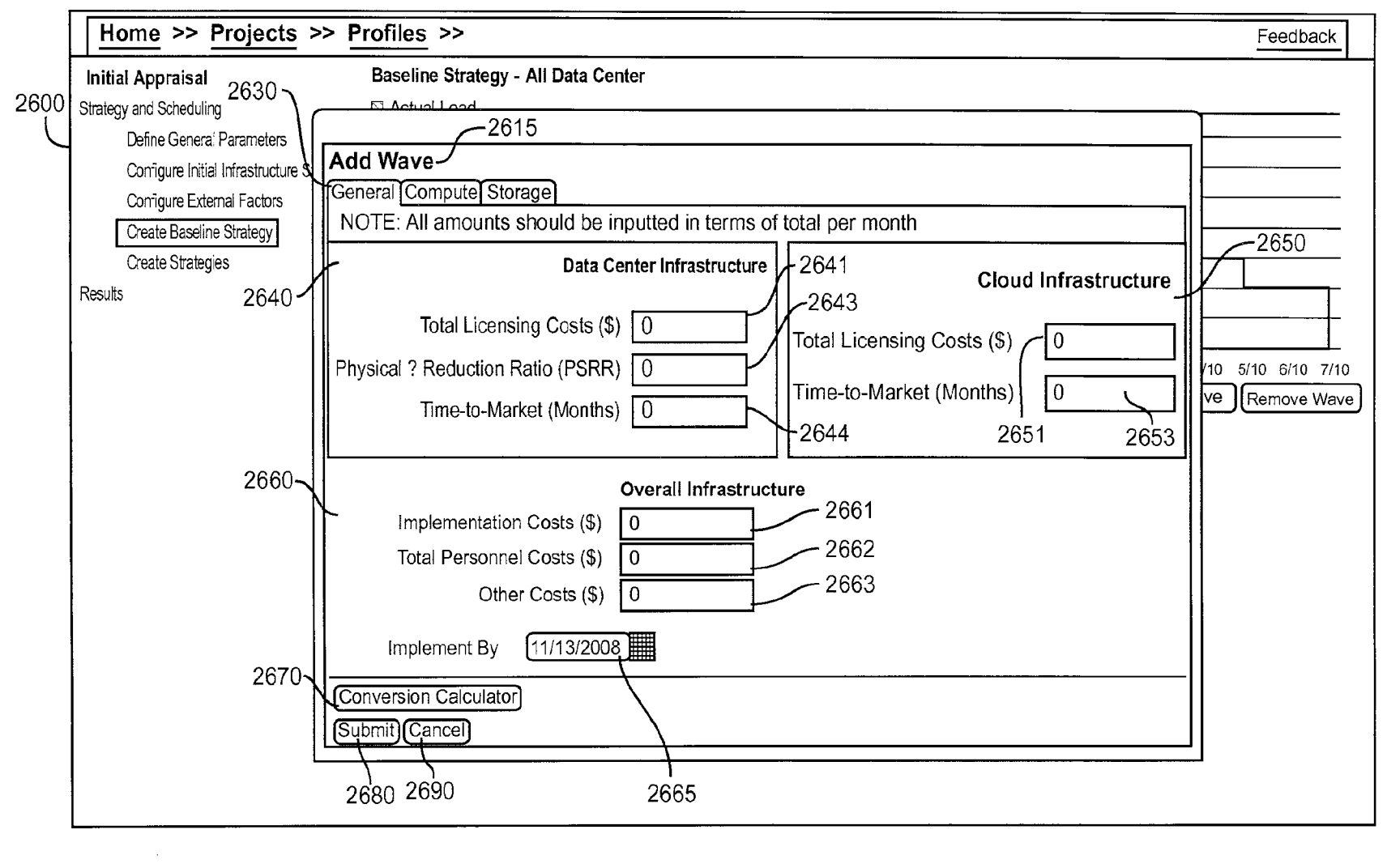

FIG. 26A is a screenshot of an alternative user interface 2600 for inputting general requirements for a time interval in the system of FIG. 1, or other systems for providing a cloud computing assessment tool. The service provider server 240 may display the user interface 2600 to the user A 120A when the user A 120A clicks on the general tab in the tabset 2630. The user A 120A may use the user interface 2600 to input the general requirements for the wave. The user interface 2600 may include an add wave subsection 2615. The add wave subsection 2615 may include a tabset 2630, a data center subsection 2640, a cloud subsection 2650, an overall subsection 2660, a conversion calculator button 2670, a submit button 2680, and a cancel button 2690. The data center subsection 2640 may include a licensing costs field 2641, a physical server reduction ratio (PSRR) field 2643, and a time to market field 2644. The cloud subsection 2650 may include a licensing cost field 2651, and a time-to-market field 2653. The overall subsection 2660 may include an implementation costs field 2661, a personnel costs field 2662, an other costs field 2663, and an implement by date field 2665. The user interface 2600 may also include an interval selector, a start date field, and an end date field.

The user A 120A may input information describing the general data center configuration for the wave in the data center subsection 2640. The user A 120A may input information describing the general cloud configuration for the wave in the cloud subsection 2650. The user A 120A may input the general overall requirements for the wave in the overall subsection 2660. The other costs field 2663 may be used to identify other costs that have not been previously identified. The user A 120A may click on the conversion calculator button 2670 to access a calculator for converting between data center infrastructure and cloud infrastructure. The user A 120A may submit the inputted data by clicking on the submit button 2680. The user A 120A may cancel the process by clicking on the cancel button 2490.

Figure 27:
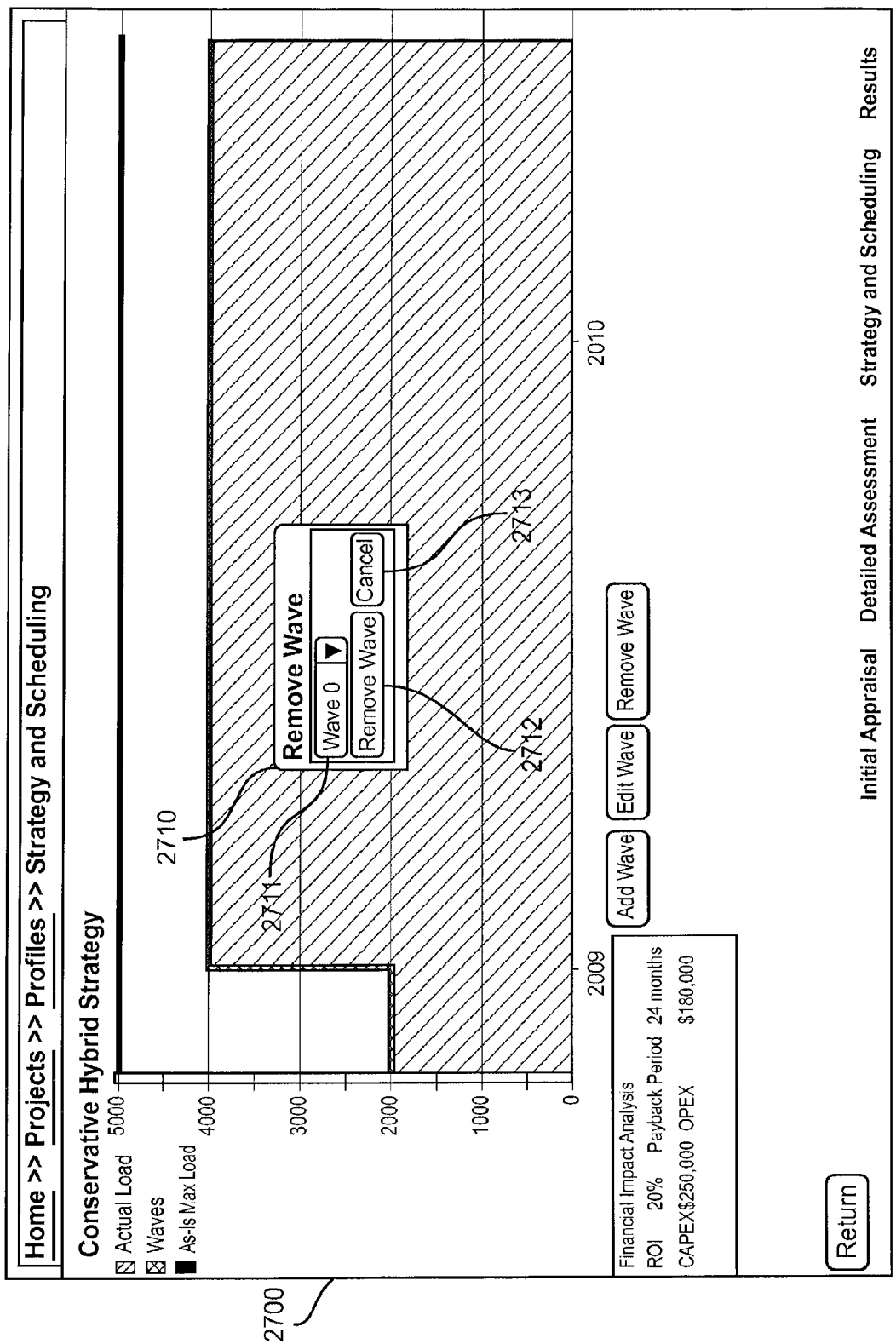
FIG. 27 is a screenshot of a user interface for removing a time interval in the system of FIG. 1, or other systems for providing a cloud computing assessment tool.

FIG. 27 is a screenshot of a user interface 2700 for removing a time interval in the system of FIG. 1, or other systems for providing a cloud computing assessment tool. The service provider server 240 may display the user interface 2700 to the user A 120A when the user A 120A clicks on the remove wave button 2370 in the user interface 2300. The user A 120A may use the user interface 2700 to remove a period of time, or wave, from the system 100. The user interface 2700 may include a remove wave subsection 2710. The remove wave subsection 2710 may include a wave selector 2711, a remove wave button 2712, and a cancel button 2713.

The user A 120A may select a wave to remove using the wave selector 2711. The user A 120A may remove the wave by clicking on the remove wave button 2712. The user A 120A may cancel removing a wave by clicking on the cancel button 2713.

Figure 28:
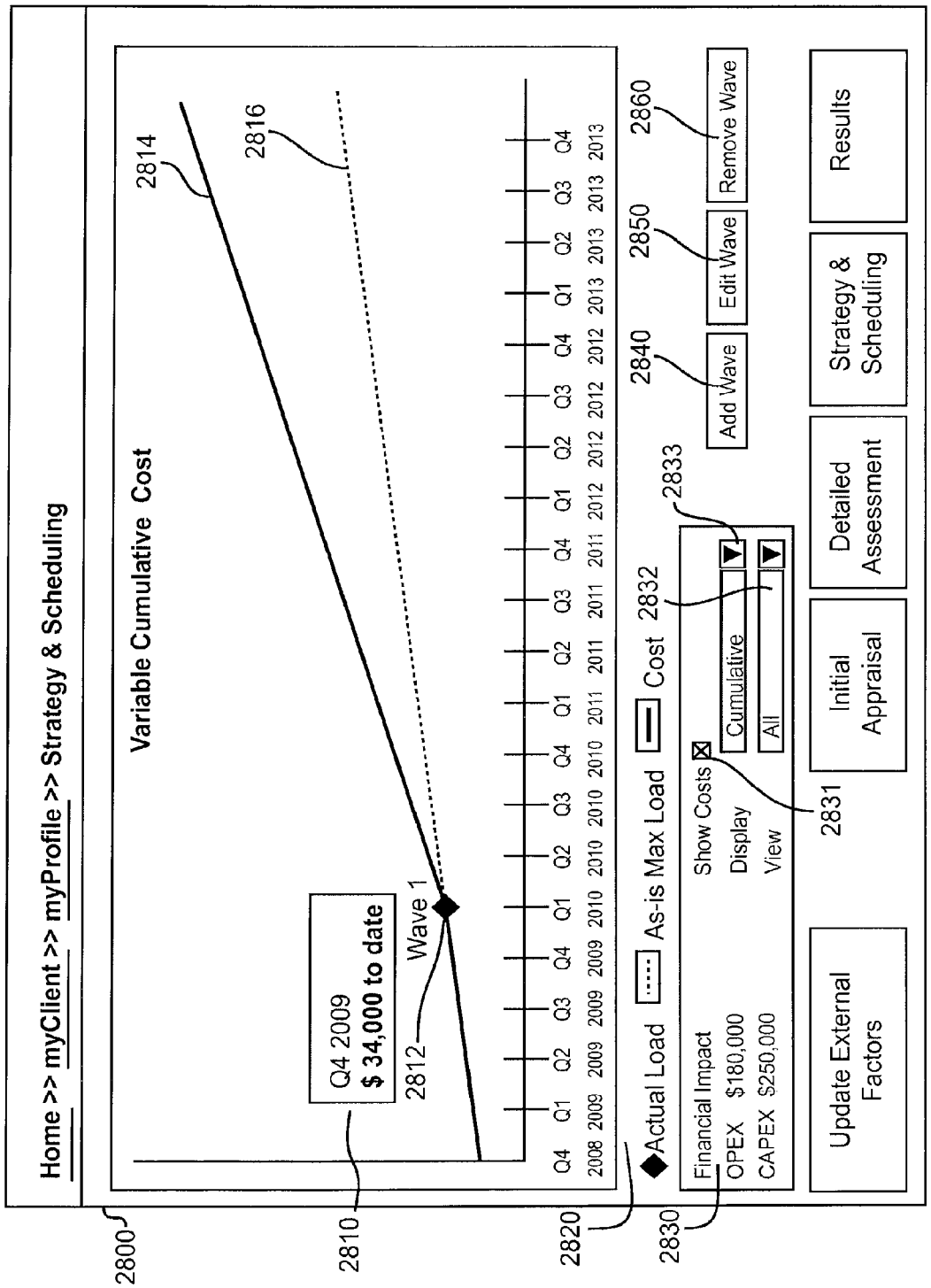
FIG. 28 is a screenshot of a report screen for displaying cumulative implementation cost in the system of FIG. 1, or other systems for providing a cloud computing assessment tool.

FIG. 28 is a screenshot of a report screen 2800 for displaying cumulative implementation cost in the system of FIG. 1, or other systems for providing a cloud computing assessment tool. The user A 120A may use the report screen 2800 to view the variable cumulative cost of a wave. The report screen 2800 may include a graph 2810, a legend 2820, a financial impact subsection 2830, an add wave button 2840, an edit wave button 2850, and a remove wave button 2860. The graph 2810 may include a cost line 2814, a wave identifier 2812, and a max load line 2816. The financial impact subsection 2830 may include a show costs selector 2831, a display selector 2833, and a view selector 2832.

The user A 120A may view the cost associated with the wave identified by the wave identifier 2812 in the graph 2810. The user A 120A may view the financial impact of the wave in the financial impact subsection 2830. The user A 120A may select whether to show costs on the graph 2810 by clicking on the show costs selector 2831. The user A 120A may select the type of data to display in the graph 2810 using the display selector 2833 and the view selector 2832. The user A 120A may add a wave to the system 100 by clicking on the add wave button 2840. The user A 120A may edit a wave by clicking on the edit wave button 2850. The user A 120A may remove a wave from the system 100 by clicking on the remove wave button 2860.

Figure 29:
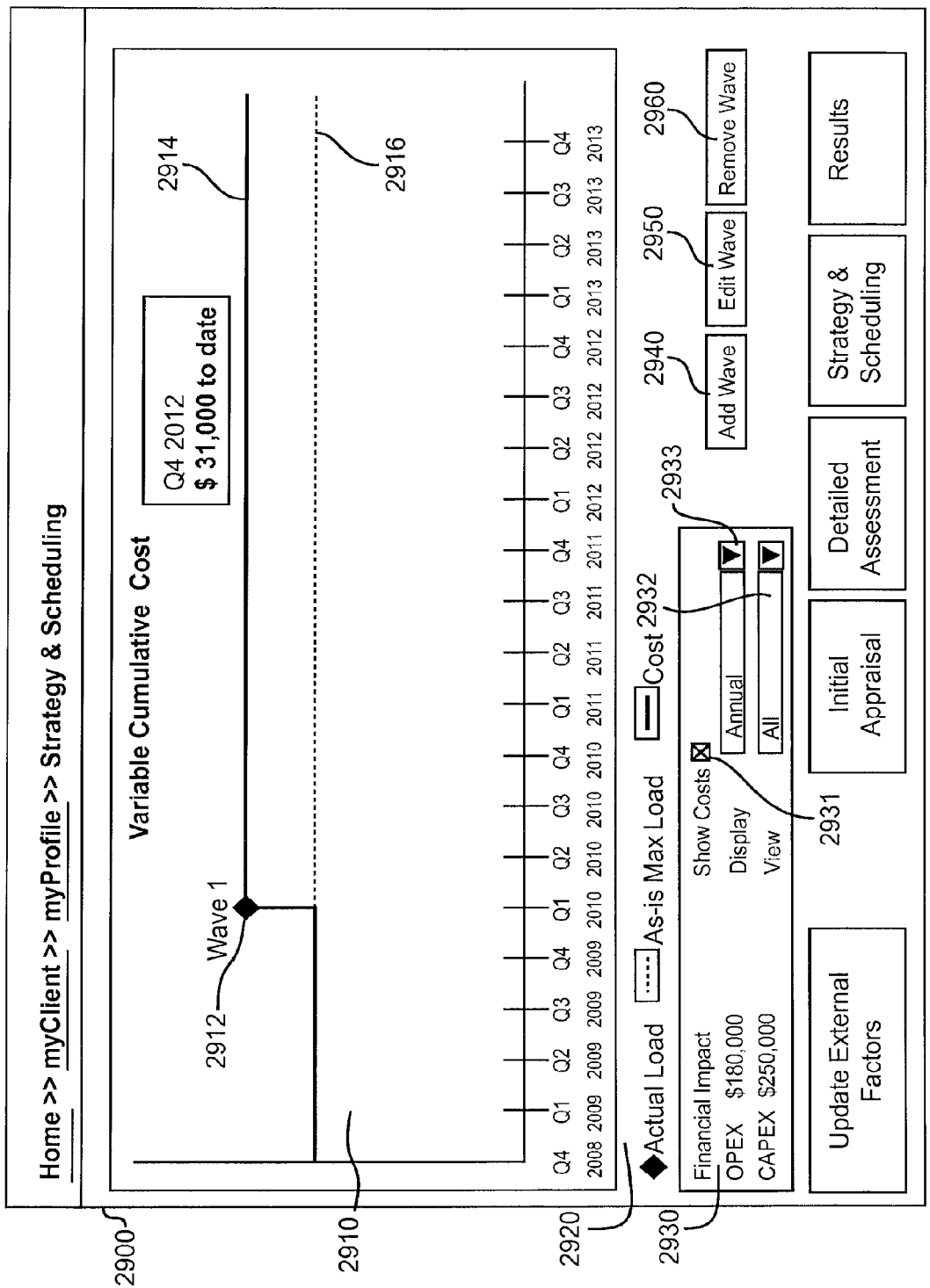
FIG. 29 is a screenshot of a report screen for displaying annual implementation cost in the system of FIG. 1, or other systems for providing a cloud computing assessment tool.

FIG. 29 is a screenshot of a report screen 2900 for displaying annual costs in the system of FIG. 1, or other systems for providing a cloud computing assessment tool. The user A 120A may use the report screen 2900 to view annual costs associated with a cloud computing transition. The report screen 2900 may include a graph 2910, a legend 2920, a financial impact subsection 2930, an add wave button 2940, an edit wave button 2950, and a remove wave button 2960. The graph 2910 may include a wave identifier 2912, a cost line 2914, and a current max load line 2916. The financial impact subsection 2930 may include a show costs checkbox 2931, a display selector 2933, and a view selector 2932.

The user A 120A may view annual costs associated with the wave identified in the wave identifier 2912 in the graph 2910. The user A 120A may view the annual cost for the wave through the cost data line 2914. The user A 120A may view the current max load for the wave on the current max load line 2916. The user A 120A may change the data displayed on the graph 2910 using the display selector 2933 and the view selector 2932. For instance, the user may wish to change the display selector 2933 and the view selector 2932 to view a graph of the annual cost difference between different transition strategies. The user A 120A may toggle whether to display costs on the graph 2910 using the show costs checkbox 2931. The user A 120A may add a wave to the system 100 using the add wave button 2940. The user A 120A may edit a wave by clicking on the edit wave button 2950. The user A 120A may remove a wave from the system 100 by clicking on the remove wave button 2960.

Figure 29A:
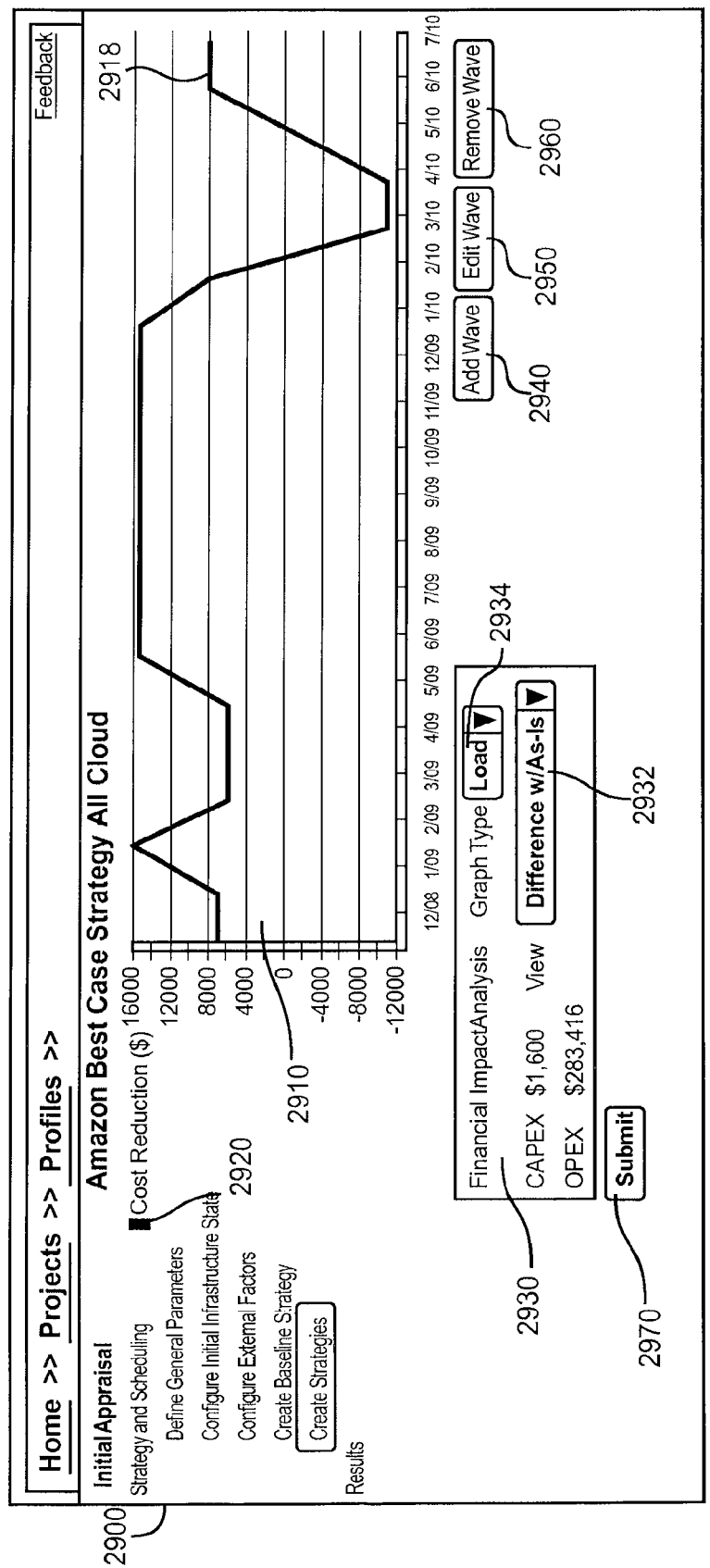
FIG. 29A is a screenshot of an alternative report screen for displaying annual implementation cost in the system of FIG. 1, or other systems for providing a cloud computing assessment tool.

FIG. 29A is a screenshot of an alternative report screen 2900 for displaying annual costs in the system of FIG. 1, or other systems for providing a cloud computing assessment tool. The user A 120A may use the report screen 2900 to view cost reductions associated with a cloud computing transition. The report screen 2900 may include a graph 2910, a legend 2920, a financial impact subsection 2930, an add wave button 2940, an edit wave button 2950, and a remove wave button 2960. The graph 2910 may include a cost reduction line 2918. The financial impact subsection 2930 may include a view selector 2932, and a graph type selector 2934.

The user A 120A may view cost reductions associated with a cloud computing transition in the graph 2910. The user A 120A may view the cost reductions through the cost reduction line 2918. The user A 120A may change the data displayed on the graph 2910 using the view selector 2932 and the graph type selector 2934. The user A 120A may add a wave to the system 100 using the add wave button 2940. The user A 120A may edit a wave by clicking on the edit wave button 2950. The user A 120A may remove a wave from the system 100 by clicking on the remove wave button 2960.

Figure 30:
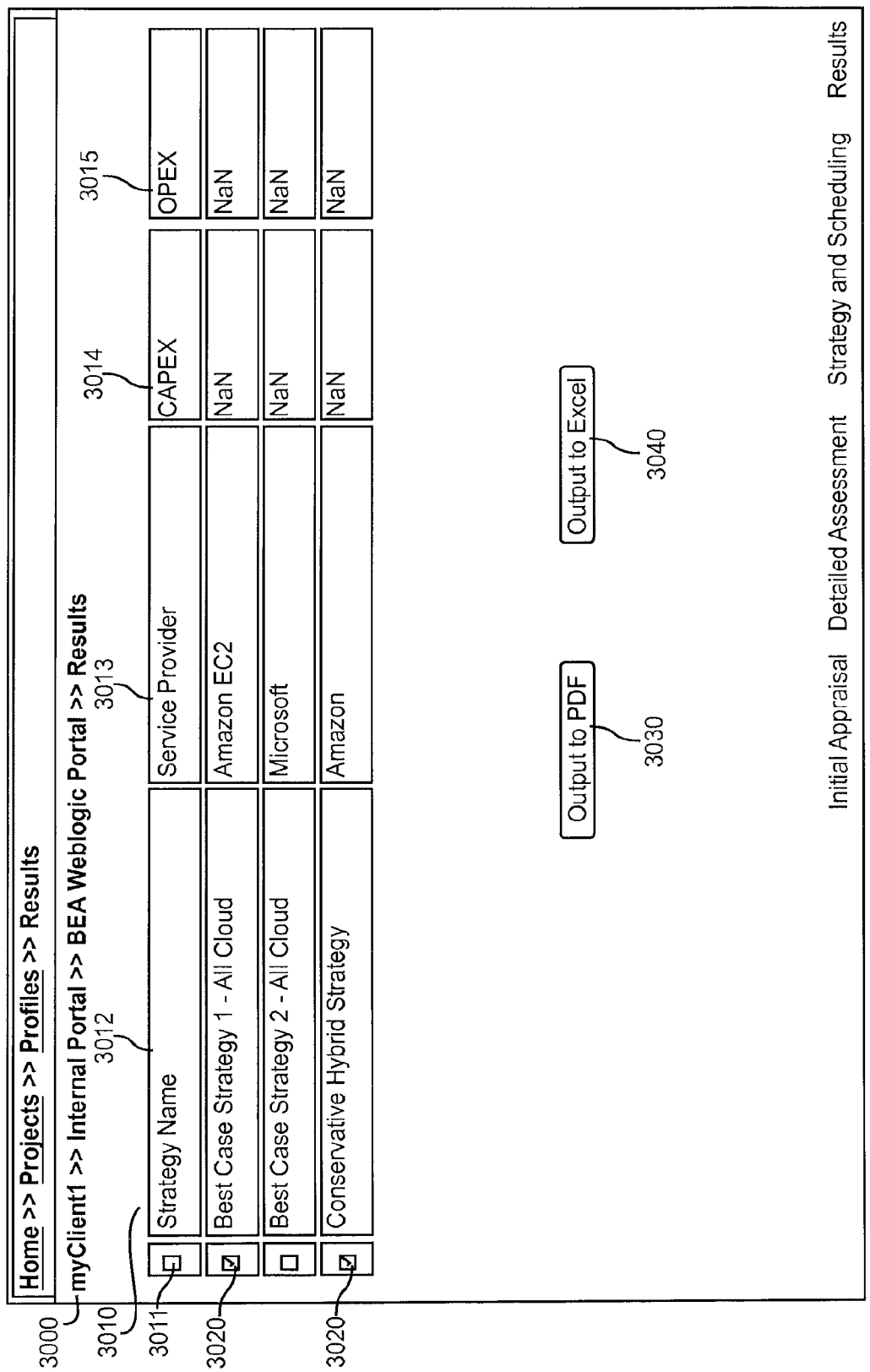
FIG. 30 is a screenshot of a report generation screen in the system of FIG. 1, or other systems for providing a cloud computing assessment tool.

FIG. 30 is a screenshot of a report generation screen 3000 in the system of FIG. 1, or other systems for providing a cloud computing assessment tool. The user A 120A may use the report generation screen 3000 to generate reports for one or more strategies in the system 100. The report generation screen 3000 may include a strategy table 3010, an output to PDF button 3030, and an output to Excel button 3040. Each row in the strategy table 3010 may include a checkbox 3020.

The user A 120A may view information describing each strategy in the strategy table 3010. The strategy table 3010 may display information describing each strategy, such as the strategy name, the cloud computing provider for the strategy, the capital expenditures for the strategy and the operational expenditures for the strategy. The user A 120A may select one or more strategies by clicking on the checkbox 3020 associated with each strategy. The user A 120A may generate a report for the selected strategies by clicking on the output to PDF button 3030 or the output to Excel button 3040. The output to PDF button 3030 may output the report in ADOBE ACROBAT format, while the output to Excel button 3040 may output the report in MICROSOFT EXCEL format. Alternatively or in addition, the system 100 may support outputting reports in any known data format, extensible markup language (XML) or hyper-text markup language (HTML).

FIG. 31 illustrates a general computer system 3100, which may represent a service provider server 240, or any of the other computing devices referenced herein. The computer system 3100 may include a set of instructions 3124 that may be executed to cause the computer system 3100 to perform any one or more of the methods or computer based functions disclosed herein. The computer system 3100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 3100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 3124 (sequential or otherwise) that specify actions to be taken by that machine. In a particular embodiment, the computer system 3100 may be implemented using electronic devices that provide voice, video or data communication. Further, while a single computer system 3100 may be illustrated, the term "system" shall also be taken to include any collection of systems or subsystems that individually or jointly execute a set, or multiple sets, of instructions to perform one or more computer functions.

As illustrated in FIG. 31, the computer system 3100 may include a processor 3102, such as, a central processing unit (CPU), a graphics processing unit (GPU), or both. The processor 3102 may be a component in a variety of systems. For example, the processor 3102 may be part of a standard personal computer or a workstation. The processor 3102 may be one or more general processors, digital signal processors, application specific integrated circuits, field programmable gate arrays, servers, networks, digital circuits, analog circuits, combinations thereof, or other now known or later developed devices for analyzing and processing data. The processor 3102 may implement a software program, such as code generated manually (i.e., programmed).

The computer system 3100 may include a memory 3104 that can communicate via a bus 3108. The memory 3104 may be a main memory, a static memory, or a dynamic memory. The memory 3104 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 3104 may include a cache or random access memory for the processor 3102. Alternatively or in addition, the memory 3104 may be separate from the processor 3102, such as a cache memory of a processor, the system memory, or other memory. The memory 3104 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 3104 may be operable to store instructions 3124 executable by the processor 3102. The functions, acts or tasks illustrated in the figures or described herein may be performed by the programmed processor 3102 executing the instructions 3124 stored in the memory 3104. The functions, acts or tasks may be independent of the particular type of instructions set, storage media, processor or processing strategy and may be performed by software, hardware, integrated circuits, firm-ware, micro-code and the like, operating alone or in combination.

Likewise, processing strategies may include multiprocessing, multitasking, parallel processing and the like.

The computer system 3100 may further include a display 3114, such as a liquid crystal display (LCD), an organic light emitting diode (OLED), a flat panel display, a solid state display, a cathode ray tube (CRT), a projector, a printer or other now known or later developed display device for outputting determined information. The display 3114 may act as an interface for the user to see the functioning of the processor 3102, or specifically as an interface with the software stored in the memory 3104 or in the drive unit 3106.

Additionally, the computer system 3100 may include an input device 3112 configured to allow a user to interact with any of the components of system 3100. The input device 3112 may be a number pad, a keyboard, or a cursor control device, such as a mouse, or a joystick, touch screen display, remote control or any other device operative to interact with the system 3100.

The computer system 3100 may also include a disk or optical drive unit 3106. The disk drive unit 3106 may include a computer-readable medium 3122 in which one or more sets of instructions 3124, e.g. software, can be embedded. Further, the instructions 3124 may perform one or more of the methods or logic as described herein. The instructions 3124 may reside completely, or at least partially, within the memory 3104 and/or within the processor 3102 during execution by the computer system 3100. The memory 3104 and the processor 3102 also may include computer-readable media as discussed above.

The present disclosure contemplates a computer-readable medium 3122 that includes instructions 3124 or receives and executes instructions 3124 responsive to a propagated signal; so that a device connected to a network 235 may communicate voice, video, audio, images or any other data over the network 235. Further, the instructions 3124 may be transmitted or received over the network 235 via a communication interface 3118. The communication interface 3118 may be a part of the processor 3102 or may be a separate component. The communication interface 3118 may be created in software or may be a physical connection in hardware. The communication interface 3118 may be configured to connect with a network 235, external media, the display 3114, or any other components in system 3100, or combinations thereof. The connection with the network 235 may be a physical connection, such as a wired Ethernet connection or may be established wirelessly as discussed below. Likewise, the additional connections with other components of the system 3100 may be physical connections or may be established wirelessly. In the case of a service provider server 240 or the content provider servers 110A-N, the servers may communicate with users 120A-N through the communication interface 3118.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 3122 may be a single medium, or the computer-readable medium 3122 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 3122 may include a solid-state memory such as a memory card or other package that houses one or more non-volatile read-only memories. The computer-readable medium 3122 also may be a random access memory or other volatile re-writable memory. Additionally, the computer-readable medium 3122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A computer implemented method of assessing whether a data center configuration is suitable for a transition to a cloud computing provider, comprising:

communicating, using a processor executing a communications interface, a cloud computing assessment to a user, the cloud computing assessment comprising a plurality of questions related to a data center configuration;

receiving, into a memory coupled to the processor, via the communications interface, a plurality of answers from the user, each answer corresponding to a question in the plurality of questions, wherein each answer describes a characteristic of the data center configuration;

executing, by the processor, instructions stored in the memory, the instructions:

generating a score for each answer, wherein the score corresponds to a suitability of the characteristic described by the answer for a cloud computing transition;

receiving a selection of a cloud computing provider from a user;

determining a weight value for each question, each weight value corresponding to a significance of the answer to each question to the a cloud computing provider;

calculating a total score for the cloud computing assessment, the total score including a highest cloud computing provider score, wherein the total score is based on the score for each answer and the weight value for each question, the calculating comprising:

receiving a selection of one or more cloud goals from the user;

weighting each of the scores based on the one or more of the cloud goals associated with a profile of the user;

identifying the highest cloud computing provider score;

determining whether the highest cloud computing provider score satisfies a cloud computing transition criteria where the cloud computing transition criteria comprises a minimum score value, and when the highest cloud computing provider score does not meet the cloud computing transition criteria, notifying the user that the profile is not suitable for a cloud computing transition and notifying the user that at least one characteristic of the data center configuration is not suitable for cloud computing transition, when the highest cloud computing provider score meets the cloud transition criteria, providing the user a description of the cloud computing provider with the highest cloud computing provider score, and an interface for planning a transition strategy for the profile;

identifying, by the user, the current configuration of a computing component represented by the profile, a period of time for the transition, and one or more trend values that effect the transition, external values including compute capacity requirements, storage capacity requirements, hardware costs, energy costs, cloud computing costs, and equipment power rating;

determining a cloud computing configuration equivalent to the current configuration of the computing component, and generating and providing the transition strategy for the profile to the cloud computing configuration to the user, using the current configuration of the computing component, the equivalent cloud computing configuration, the period of time and the external values; and providing the total score to the user, wherein the total score indicates whether the data center configuration is suitable for a transition to the cloud computing provider.

2. The computer implemented method of claim 1 further comprising: providing a statement relating to the total score to the user, wherein the statement describes a significance of the score and an application of the score to the cloud computing assessment.

3. The computer implemented method of claim 1 further comprising:

receiving a selection of a cloud goal from a user;

determining a cloud goal weight value for each question, each cloud goal weight value corresponding to a significance of the question to the cloud goal;

calculating a total score for the cloud computing assessment, wherein the total score is based on the score for each answer, the weight value for each question, and the cloud goal weight value for each question; and providing the total score to the user, wherein the total score indicates whether the data center configuration is suitable for the transition to the cloud computing provider.

4. The computer implemented method of claim 3 further comprising: providing a statement relating to the total score to the user, wherein the statement describes a significance of the score and an application of the score to the cloud computing assessment.

5. The computer implemented method of claim 3 wherein the cloud goal comprises at least one of a cost avoidance goal, an agility goal, a time-to-market goal, or a high performance computing goal.

6. The computer implemented method of claim 3 wherein the cloud goal weight value is based on a likelihood of the cloud goal being achieved by the transition to the cloud computing provider.

7. The computer implemented method of claim 1 further comprising notifying the user that the data center configuration is suitable for the cloud computing provider if the total score satisfies the cloud computing transition criteria, otherwise notifying the user that the data center configuration is not suitable for the cloud computing provider.

8. The computer implemented method of claim 1 wherein the plurality of questions comprises at least one question related to a performance requirement, a security requirement, a regulation requirement, a governance requirement, a storage requirement, an implementation complexity, or a use profile.

9. The computer implemented method of claim 1 wherein the weight value is based on a readiness of a technology of the cloud computing provider for the transition.

10. A computer implemented method for determining a cloud computing provider for hosting a computing component, comprising:

communicating, using a processor executing a communications interface, a cloud computing assessment to a user, the cloud computing assessment comprising a plurality of questions related to a computing component;

receiving, into a memory coupled to the processor, via the communications interface, a plurality of answers from the user, each answer corresponding to a question in the plurality of questions, wherein each answer describes a characteristic of the computing component;

executing, by the processor, instructions stored in the memory, the instructions:

generating a score for each answer, wherein the score corresponds to a suitability of the characteristic described by the answer for a cloud computing transition;

identifying a plurality of cloud computing providers, each cloud computing provider offering a cloud computing service;

determining for each cloud computing provider, a weight value for each question, each weight value corresponding to a significance of the answer of each question to each cloud computing provider;

calculating for each cloud computing provider, a total score for the cloud computing assessment, the total score including a highest cloud computing provider score, wherein the total score is based on the score for each answer and the weight value of each cloud computing provider for each question the calculating comprising:

receiving a selection of one or more cloud goals from the user;

weighting each of the scores based on the one or more of the cloud goals associated with a profile of the user;

identifying the highest cloud computing provider score;

determining whether the highest cloud computing provider score satisfies a cloud computing transition criteria where the cloud computing transition criteria comprises a minimum score value, and when the cloud computing provider with a highest total score does not meet cloud computing transition criteria, notifying the user that the profile is not suitable for a cloud computing transition and notifying the user that at least one characteristic of the computing component is not suitable for cloud computing transition, when the highest cloud computing provider score meets the cloud transition criteria, providing the user a description of the cloud computing provider with the highest cloud computing provider score, and an interface for planning a transition strategy for the profile;

identifying, by the user, the current configuration of a computing component represented by the profile, a period of time for the transition, and one or more trend values that effect the transition, external values including compute capacity requirements, storage capacity requirements, hardware costs, energy costs, cloud computing costs, and equipment power rating;

determining a cloud computing configuration equivalent to the current configuration of the computing component, generating and providing the transition strategy for the profile to the cloud computing configuration to the user, using the current configuration of the computing component, the equivalent cloud computing configuration, the period of time and the external values; and providing a description of the cloud computing provider with a highest total score to the user.

11. The computer implemented method of claim 10 further comprising providing the user with a graphical output demonstrating a cost comparison of the computing component in a data center and the computing component hosted by the cloud computing provider.

12. The computer implemented method of claim 10 wherein providing a description of the cloud computing provider with a highest total score to the user further comprises:

providing a description of the cloud computing provider with a highest total score to the user if the highest total score satisfies a cloud computing transition criteria, otherwise notifying the user that the computing component is not suitable for the cloud computing transition.

13. A computer implemented method of assessing whether a data center configuration is suitable for a transition to a cloud computing provider, comprising:

communicating, using a processor executing a communications interface, a cloud computing assessment to a user, the cloud computing assessment comprising a plurality of questions related to a data center configuration;

receiving, into a memory coupled to the processor, via the communications interface, a plurality of answers from the user, each answer corresponding to a question in the plurality of questions, wherein each answer describes a characteristic of the data center configuration;

executing, by the processor, instructions stored in the memory, the instructions:

generating a score for each answer, wherein the score corresponds to a suitability of the characteristic described by the answer for a cloud computing transition;

receiving a selection of a cloud computing provider from a user;

determining a weight value for each question, each weight value corresponding to a significance of the answer to each question to the cloud computing provider;

calculating a total score for the cloud computing assessment, the total score including a highest cloud computing provider score, wherein the total score is based on the score for each answer and the weight value for each question, the calculating comprising:

receiving a selection of one or more cloud goals from the user;

weighting each of the scores based on the one or more of the cloud goals associated with a profile of the user, the one or more of the cloud goals associated with the profile including: cost avoidance, agility, elasticity, high performance computing, time to market, or any combination thereof, wherein the agility, elasticity or both refer to an ability to scale resources up or down as needed;

identifying, by the service provider, the highest cloud computing provider score;

determining whether the highest score meets a cloud computing transition criteria, where the cloud computing transition criteria comprises a minimum score value identified by the administrator, and when the highest cloud computing provider score does not meet the cloud computing transition criteria, notifying the user that the profile is not suitable for a cloud computing transition and notifying the user that at least one characteristic of the data center configuration is not suitable for cloud computing transition, when the highest cloud computing provider score meets the cloud transition criteria, providing the user a description of the cloud computing provider with the highest cloud computing provider score, and an interface for planning a transition strategy for the profile;

identifying, by the user, the current configuration of a computing component represented by the profile, a period of time for the transition, and one or more trend values that effect the transition, external values including compute capacity requirements, storage capacity requirements, hardware costs, energy costs, cloud computing costs, and equipment power rating;

determining, by the service provider, a cloud computing configuration equivalent to the current configuration of the computing component, generating ad providing the transition strategy for the profile to the cloud computing configuration to the user, using the current configuration of the computing component, the equivalent cloud computing configuration, the period of time and the external values;

providing the total score to the user, wherein the total score indicates whether the data center configuration is suitable for a transition to the cloud computing provider.

* * * * *